(12) United States Patent
Marupaduga

(10) Patent No.: US 11,317,326 B1
(45) Date of Patent: Apr. 26, 2022

(54) ADDITION THRESHOLDS FOR WIRELESS ACCESS NODES BASED ON CELL SITE DENSITY

(71) Applicant: T-MOBILE INNOVATIONS LLC, Overland Park, KS (US)

(72) Inventor: Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 17/071,286

(22) Filed: Oct. 15, 2020

(51) Int. Cl.
*H04W 36/00* (2009.01)
*H04W 36/08* (2009.01)
*H04W 24/08* (2009.01)
*H04W 36/14* (2009.01)
*H04W 80/02* (2009.01)
*H04W 88/06* (2009.01)

(52) U.S. Cl.
CPC ....... *H04W 36/0058* (2018.08); *H04W 24/08* (2013.01); *H04W 36/0069* (2018.08); *H04W 36/0085* (2018.08); *H04W 36/08* (2013.01); *H04W 36/14* (2013.01); *H04W 80/02* (2013.01); *H04W 88/06* (2013.01)

(58) Field of Classification Search
CPC ............. H04W 36/0058; H04W 24/08; H04W 36/0069; H04W 36/0085; H04W 36/08; H04W 36/14; H04W 80/02; H04W 88/06; H04W 24/02; H04W 24/10; H04W 36/0022; H04W 48/20; H04W 16/08
See application file for complete search history.

(56) References Cited

U.S. PATENT DOCUMENTS

| | | | |
|---|---|---|---|
| 9,479,977 | B2 | 10/2016 | Hedberg et al. |
| 9,654,357 | B2 | 5/2017 | Fox et al. |
| 9,860,803 | B2 | 1/2018 | Mochizuki et al. |
| 9,924,413 | B2 | 3/2018 | Adjakple et al. |
| 10,057,034 | B2 | 8/2018 | Yanover et al. |
| 10,084,515 | B2 | 9/2018 | Ferrante et al. |
| 10,425,822 | B2 | 9/2019 | Yang |
| 2015/0334612 | A1* | 11/2015 | Ray Chaudhuri .... H04W 36/20 455/437 |
| 2020/0037219 | A1* | 1/2020 | Kumar .................. H04W 36/08 |
| 2020/0145995 | A1* | 5/2020 | Abdel Shahid ... H04W 72/0486 |
| 2021/0337442 | A1* | 10/2021 | Da Silva .............. H04B 7/0617 |

* cited by examiner

*Primary Examiner* — Erica Navar

(57) ABSTRACT

A primary access node adds a secondary access node to deliver wireless communication service to a wireless User Equipment (UE). The primary access node comprises a radio and baseband circuitry. The radio wirelessly receives a measurement report from the UE characterizing a radio metric for the secondary access node and transfers the measurement report to the baseband circuitry. The baseband circuitry determines cell site density for the UE's location and determines an add threshold for the secondary access node based on the cell site density. The baseband circuitry determines an add value for the secondary access node based on the radio metric. When the add value exceeds the add threshold, the baseband circuitry transfers network signaling to the secondary access node to serve the UE and transfers user signaling to the radio. The radio wirelessly transfers the user signaling to the UE to attach to the secondary access node.

18 Claims, 11 Drawing Sheets

ADDITION THRESHOLDS FOR WIRELESS ACCESS NODES BASED ON CELL SITE DENSITY

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes that exchange wireless signals over frequency channels with the wireless user devices using wireless network protocols. Exemplary wireless network protocols include Institute of Electrical and Electronic Engineers (IEEE) 802.11 (WIFI), Long Term Evolution (LTE), Fifth Generation New Radio (5GNR), Millimeter Wave (MMW) and Low-Power Wide Area Network (LP-WAN). In some examples, both LTE and 5GNR networks serve the same wireless user device at the same time with an integrated data service called dual-connectivity. A wireless access network that provides dual connectivity simultaneously serves a single user device over parallel wireless links.

An Evolved Universal Terrestrial Radio Access Network Dual Connectivity (EN-DC) node comprises both a primary access node and one or more secondary access nodes. An EN-DC user device initially attaches to the primary access node in the EN-DC node. The primary access node transfers measurement instructions to the EN-DC user device that direct the EN-DC user device to measure signal strength for the secondary access nodes. The EN-DC user device receives the measurement instructions and measures the signal strength of the secondary access nodes. The EN-DN user device reports the signal strength for the secondary access nodes to the primary access node.

The primary access node determines if the secondary access nodes should be used to serve the EN-DC user device based on the reported signal strength. To determine if the secondary access nodes should be used, the primary access node compares received signal strengths for the secondary access nodes at the EN-DC user device to an addition threshold that is referred to as "B 1". When the received signal strengths exceed the addition threshold, the primary access node adds the secondary access nodes and the secondary access nodes exchange user data with EN-DC user device. The primary access node does not select the addition thresholds for the secondary access nodes based on performance characteristics of the secondary access nodes. For example, the primary access node does not select addition thresholds for the secondary access nodes based on the cell site density of the secondary access nodes.

The size and complexity of the secondary access nodes has a large variance. Some secondary access nodes are rather large and multi-purpose while other secondary access nodes can be small and focused. In addition, the number of secondary access nodes that are available to a wireless user device in a geographic area is rapidly increasing. Thus, the primary access node is faced with the dual problem of trying to add the optimal secondary access nodes for the wireless user device given the large selection of diverse secondary access nodes. Unfortunately, the primary access node does not effectively and efficiently add secondary access nodes given the large variance in size and complexity. Moreover, the wireless user devices use non-optimal secondary access nodes given the rapid deployment of so many different types of secondary access nodes.

TECHNICAL OVERVIEW

A primary access node adds a secondary access node to deliver wireless communication service for a wireless User Equipment (UE). The primary access node comprises baseband circuitry and a radio. The radio wirelessly receives a measurement report from the UE. The measurement report characterizes a radio metric for the secondary access node. The radio transfers the measurement report to the baseband circuitry. The baseband circuitry determines a cell site density for the geographic region of the UE. The baseband circuitry determines an add threshold for the secondary access node based on the cell site density. The baseband circuitry determines an add value for the secondary access node based on the radio metric in the measurement report. The baseband circuitry determines when the add value exceeds the add threshold. When the add value exceeds the add threshold, the baseband circuitry transfers network signaling to the secondary access node to serve the UE. The baseband circuitry transfers user signaling that directs the UE to attach to the secondary access node to the radio. The radio wirelessly transfers the user signaling to the UE. The UE attaches to the secondary access node and the secondary access node delivers the wireless communication service to the UE.

DETAILED DESCRIPTION

Figure 1:
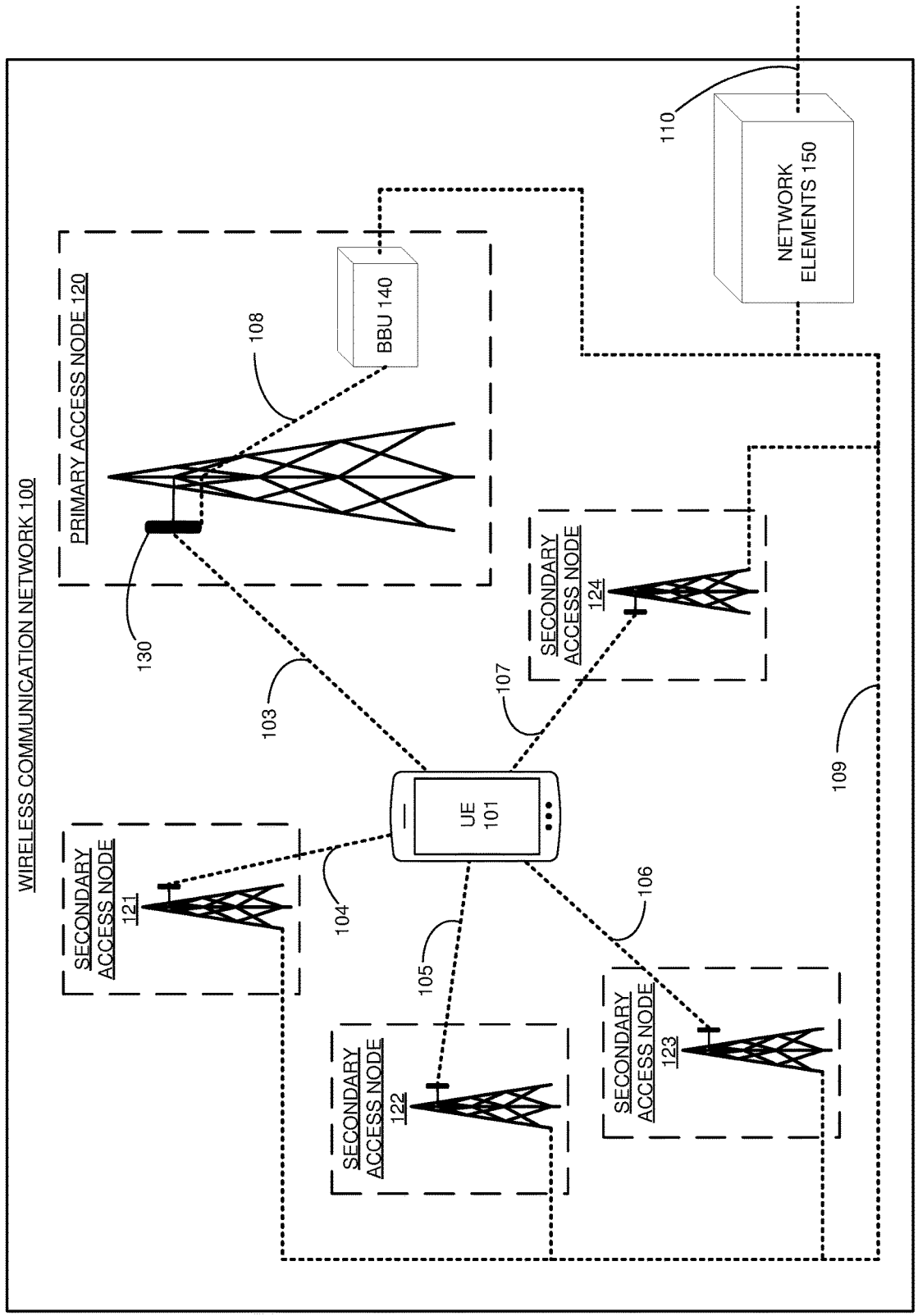
FIG. 1 illustrates a wireless communications network to serve a wireless User Equipment (UE) with a wireless communication service over multiple wireless links based on cell site density.

FIG. 1 illustrates wireless communication network 100 to serve wireless User Equipment (UE) 101 with a wireless communication service over multiple wireless links based on cell site density. Wireless communication network 100 provides wireless data services to UE 101 like machine-control, internet-access, media-streaming, social-networking, and/or some other type of wireless networking product. Wireless communication network 100 comprises wireless UE 101, links 103-110, primary access node 120, secondary access nodes 121-124, and network elements 150. Primary access node 120 comprises radio 130 and Baseband Unit (BBU) 140.

Various examples of network operation and configuration are described herein. In some examples, radio 130 wirelessly receives a measurement report from the UE 101. The measurement report characterizes radio metrics for secondary access nodes 121-124. Radio 130 transfers the measurement report BBU 140. BBU 140 determines a cell site density for the geographic region of UE 101. The geographic region could be a network sector, geographic bin, zip code, or some other type of boundary. Cell site density comprises the amount of secondary access nodes in the geographic region. BBU 140 determines an add threshold for secondary access nodes 121-124 based on the cell site density for UE 101. BBU 140 tends to increase the add thresholds as the cell site density increases. BBU 140 determines add values for secondary access nodes 121-124 based on their radio metrics in the measurement report from UE 101. BBU 140 determines when the add value for one of secondary access nodes 121-124 exceeds the add threshold for that secondary access node. When the add value exceeds the add threshold for a secondary access node, BBU 140 transfers network signaling to that secondary access node to serve UE 101. BBU 140 transfers user signaling to UE 101 over radio 130 directing UE 101 to attach to that secondary access node. UE 101 attaches to the secondary access node, and the secondary access node delivers the wireless communication service to UE 101. Advantageously, primary access node 120 effectively and efficiently adds secondary access nodes 121-124 based on cell density to help drive UE 101 toward optimal secondary access nodes instead of merely available secondary access nodes.

UE 101 and access nodes 120-124 comprise antennas, amplifiers, filters, modulation, analog/digital interfaces, microprocessors, software, memories, transceivers, bus circuitry, and the like. BBU 140 and network elements 150 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network applications. The microprocessors retrieve the software from the memories and execute the software to drive the operation of wireless communication network 100 as described herein. Although UE 101 is depicted as a smartphone, UEs 101 might instead comprise a computer, robot, vehicle, or other data appliance with wireless communication circuitry.

Access nodes 120-124 comprise Fifth Generation New Radio (5GNR) gNodeBs, Millimeter Wave (MMW) access nodes, Fifth Generation Radio Access Technology (5G RAT) nodes, Evolved Universal Terrestrial Radio Access Network Dual Connectivity (EN-DC) nodes, Long Term Evolution (LTE) eNodeBs, WIFI hotspots, Low-Power Wide Area Network (LP-WAN) nodes, and/or some other wireless network apparatus. Access nodes 120-124 are geographically dispersed, however access nodes 120-124 may be collocated. Network elements 150 comprise User Plane Functions (UPFs), Access and Mobility Management Function (AMFs), System Architecture Evolution Gateways (SAE GWs), Mobility Management Entities (MMEs), and/or some other network apparatus. Access nodes are depicted as towers, but access nodes 120-124 may use other mounting structures or no mounting structure at all.

Wireless links 103-107 use over-the-air air electromagnetic frequencies in the low-band, mid-band, high-band, or some other portion of the electromagnetic spectrum. Wireless links 103-107 use protocols like 5GNR, LTE, MMW, Institute of Electrical and Electronic Engineers (IEEE) 802.11 (WIFI), LP-WAN, and/or some other format of wireless protocol. Links 108-110 use metal, glass, air, or some other media. Links 108-110 use IEEE 802.3 (Ethernet), Time Division Multiplex (TDM), Data Over Cable System Interface Specification (DOCSIS), Internet Protocol (IP), Hypertext Transfer Protocol (HTTP), Fifth Generation Core (5GC), 5GNR, LTE, WIFI, virtual switching, inter-processor communication, bus interfaces, and/or some other data communication protocols. Links 103-110 may comprise intermediate network elements like relays, routers, and controllers.

Figure 2:
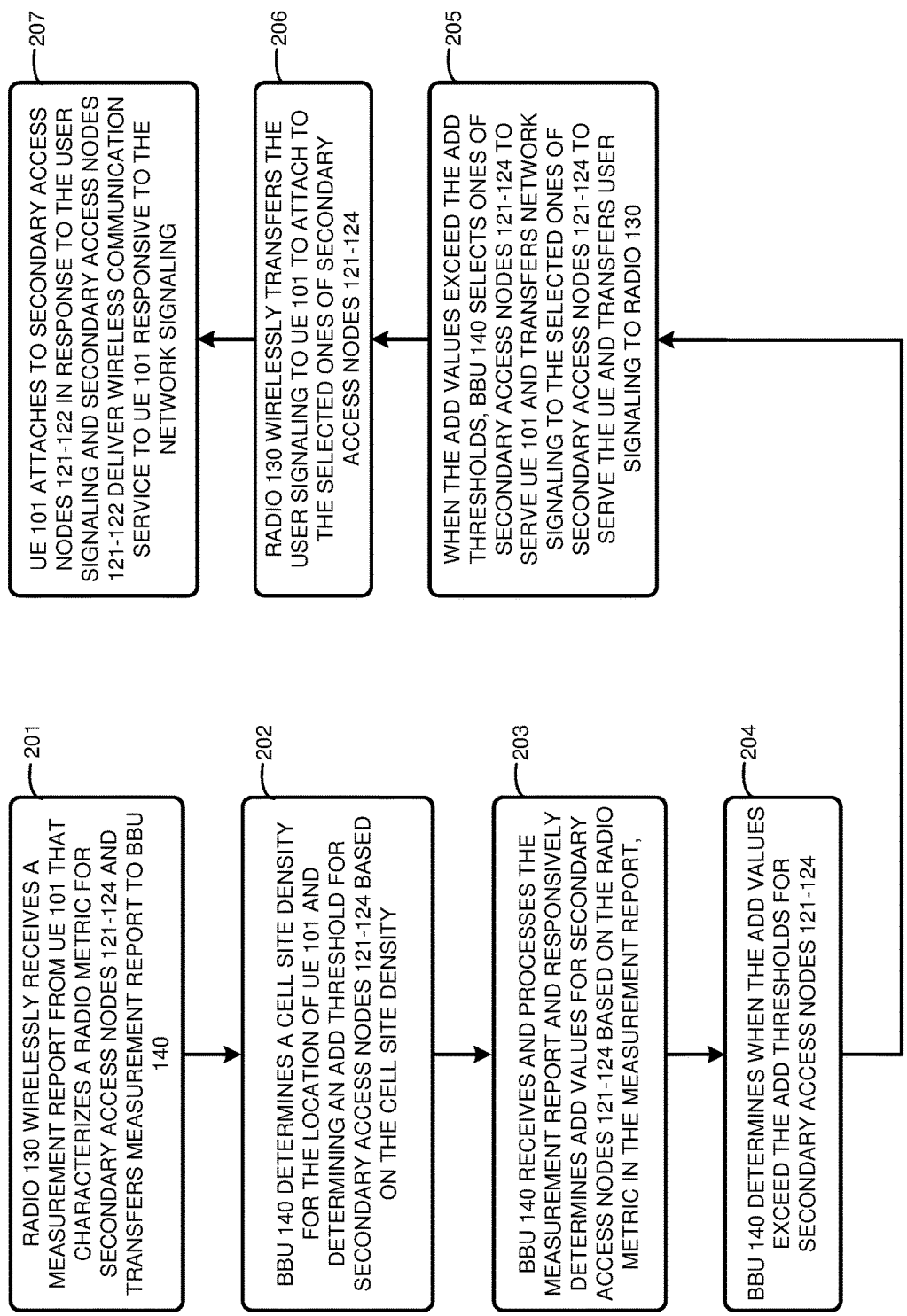
FIG. 2 illustrates an exemplary operation of the wireless communication network to serve the wireless UE over multiple wireless links based on cell site density.

FIG. 2 illustrates an exemplary operation of wireless communication network 100 to serve wireless UE 101 with a wireless communication service over multiple wireless links based on cell site density. In other examples, the operation of wireless communication network 100 may differ. Radio 130 wirelessly receives a measurement report from UE 101 that characterizes a radio metric for secondary access nodes 121-124 and transfers the measurement report to BBU 140 (201). BBU 140 determines a cell site density for the location of UE 101 and determines add thresholds for secondary access nodes 121-124 based on the cell site density (202). For example, BBU 140 may raise LTE/5GNR B1 thresholds for access nodes 121-124 as cell density increases to inhibit UE 101 from attaching to non-optimal access nodes given the greater choice of access nodes. BBU 140 receives and processes the measurement report and determines add values for secondary access nodes 121-124 based on the radio metric in the measurement report (203).

BBU 140 determines when the add values are greater than the add thresholds for secondary access nodes 121-124 (204). When the add values are greater than the add thresholds, BBU 140 selects ones of secondary access nodes 121-124 to serve UE 101 and transfers network signaling to the selected ones of secondary access nodes 121-124 to serve UE 101. BBU 140 transfers user signaling for UE 101 to attach to the selected ones of secondary access nodes 121-124 to radio 130 (205). Radio 130 wirelessly transfers the user signaling to UE 101 to attach to the selected ones of secondary access nodes 121-124 (206). UE 101 attaches to the selected ones of secondary access nodes 121-124 in response to the user signaling and the selected ones of secondary access nodes 121-124 deliver wireless communication service to UE 101 responsive to the network signaling (207).

Figure 3:
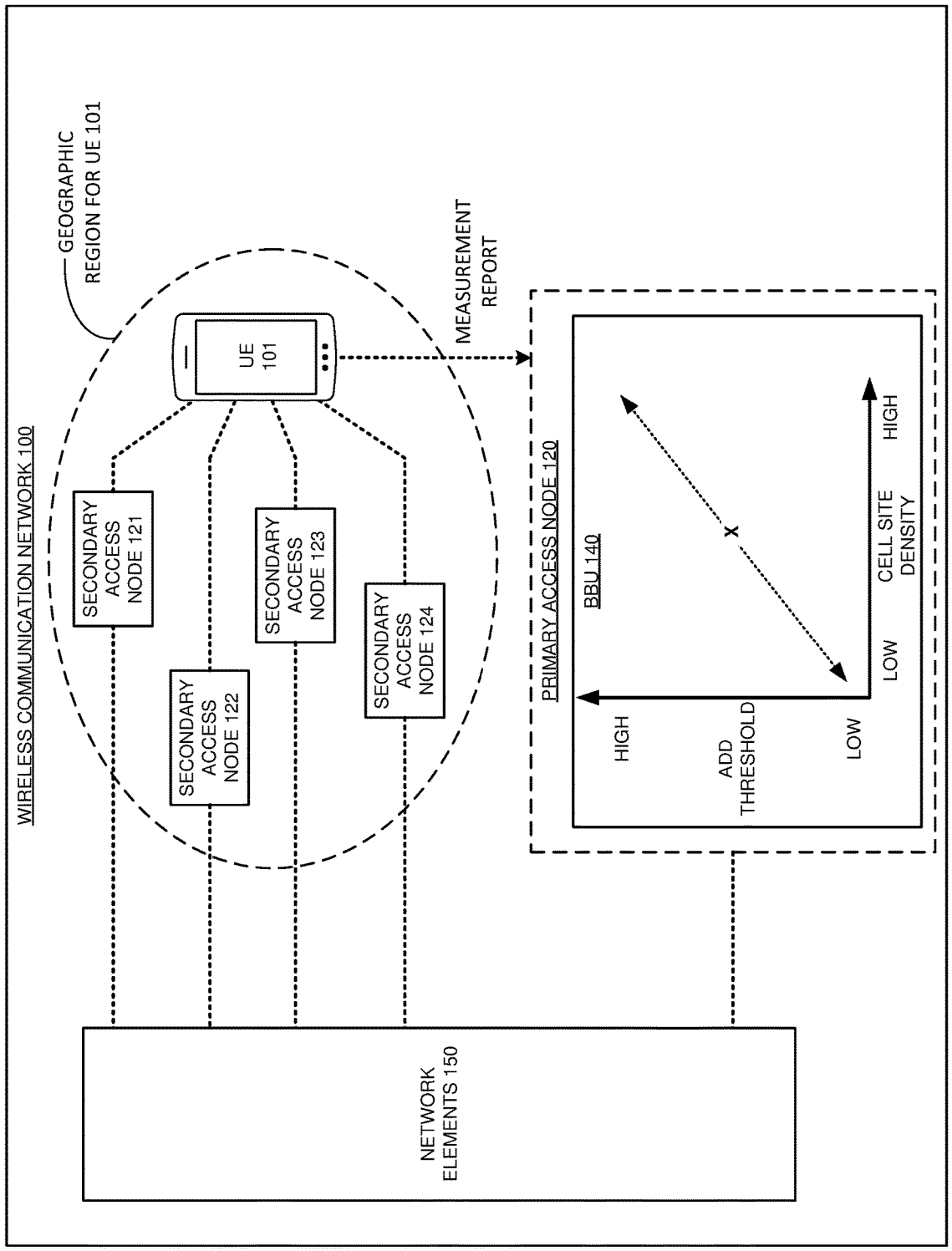
FIG. 3 illustrates the wireless communication network to implement a data structure to serve the wireless UE over multiple wireless links based on cell site density.

FIG. 3 illustrates wireless communication network 100 to serve UE 101 over multiple wireless links based on cell site density. The operation and structure of wireless network 100 may vary in other examples. UE 101 is wirelessly coupled to access nodes 120-124. Access nodes 120-124 are coupled to each other over backhaul links. As shown in FIG. 3, secondary access nodes 121-124 and UE 101 are located within a geographic region for UE 101.

Primary access node 120 comprises BBU 140. BBU 140 hosts a data structure that implements the graph shown on FIG. 3. The vertical axis of the graph indicates an add threshold in an exemplary range: Low to High. The horizontal axis indicates a cell site density in an exemplary range: Low to High. These terms are illustrative and numerical values could be used. Typically, a "low" add threshold is around −130 dBm while a "high" add threshold is around −100 dBm. As indicated by the X mark on the graph, a cell site density correlates to an add threshold. BBU 140 determines add thresholds for secondary access nodes 121-124 based on the cell site density for the geographic region of UE 101 and the data structure. Typically, BBU 140 selects high add thresholds when the cell site density is high and low add thresholds when the cell site density is low.

In operation, UE 101 attaches to primary access node 120. Primary access node 120 directs UE 101 to measure a signal metric for secondary access nodes 121-124. UE 101 wirelessly transfers a measurement report that characterizes the signal metric for secondary access nodes 121-124 to primary access node 120. The signal metric indicates a signal strength and/or signal quality for each of secondary access nodes 121-124. For example, the signal metric may comprise Received Signal Received Power (RSRP) at UE 101's location for each of secondary access nodes 121-124. Primary access node 120 transfers the measurement report to BBU 140. BBU 140 determines a cell site density for the geographic region of UE 101. In some examples, the measurement report may include Physical Cell Identifiers (PCIs) identified by UE 101. A PCI comprises a unique code that identifies a wireless access node. BBU 140 may determine cell site density for UE 101 based on the number of PCIs in the geographic region of UE 101 or may implement some other technique to determine cell site density.

BBU 140 determines add thresholds for secondary access nodes 121-124 based on the cell site density and the data structure. BBU converts the signal metric for secondary access nodes 121-124 into add values for secondary access nodes 121-124 and determines when the add values exceed their corresponding add thresholds. When the add values exceed the add thresholds, BBU 140 selects ones of secondary access nodes 121-124 to add. BBU 140 transfers network signaling to the selected ones of secondary access nodes 121-124 to serve UE 101 and transfers user signaling to UE 101 to attach to the selected ones of secondary access nodes 121-124. The selected ones of secondary access nodes 121-124 exchange user data for the wireless communication service with UE 101.

In some examples, the add values for all each of secondary access nodes 121-124 exceed the add thresholds for secondary access nodes 121-124. BBU 140 may rank the add values and direct UE 101 to attach to the secondary access node(s) with the highest add value(s). For example, BBU 140 may determine the add value for secondary access node 122 is larger than the add values for secondary access nodes 121, 123, and 124 and may then direct UE 122 to attach to secondary access node 122.

Figure 4:
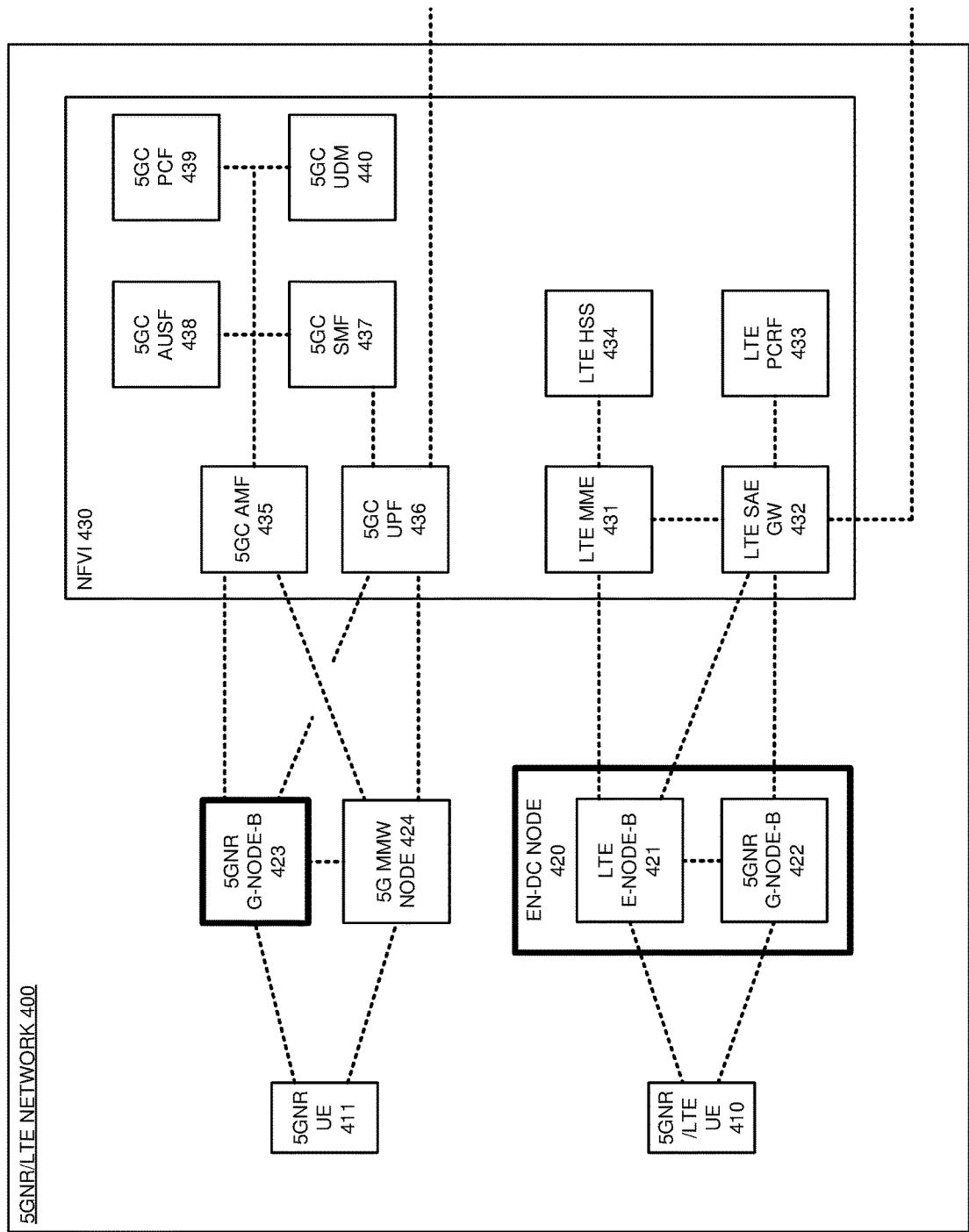
FIG. 4 illustrates a Fifth Generation New Radio (5GNR) Long Term Evolution (LTE) network to serve UEs over multiple wireless links based on cell site density.

FIG. 4 illustrates Fifth Generation New Radio (5GNR) Long Term Evolution (LTE) network 400 to serve UEs 410-411 based on cell site density. 5GNR/LTE network 400 is an example of wireless communication network 100, although network 100 may differ. 5GNR/LTE network 400 comprises 5GNR/LTE UE 410, 5GNR UE 411, EN-DC node 420, 5GNR gNodeB 423, 5G MMW node 424, and Network Function Virtualization Infrastructure (NFVI) 430. EN-DC node 420 comprises LTE eNodeB 421 and 5GNR gNodeB 422. NFVI 430 comprises LTE Mobility Management Entity (MME) 431, LTE System Architecture Evolution Gateway (SAE GW) 432 LTE, LTE Policy Charging Rules Function (PCRF) 433, LTE Home Subscriber System (HSS) 434, Fifth Generation Core (5GC) Access and Mobility Management Function (AMF) 435, 5GC User Plane Function (UPF) 436, 5GC Session Management Function (SMF) 437, 5GC Authentication and Security Function (AUSF) 438, Policy Control Function (PCF 439), and 5GC Unified Data Manager (UDM) 440. In some examples, SAE GW 432 may be divided into a Serving Gateway (SGW) and a Packet Data Network Gateway (PGW).

In operation, UE 410 attaches to LTE eNodeB 421 in EN-DC node 420 and UE 410 indicates its 5G capabilities and location. LTE eNodeB 421 requests data service for UE 410 from LTE MME 431 over S1-MME signaling and indicates the 5G capabilities of UE 410. LTE MME 431 interacts with HSS 434 to authenticate and authorize LTE/5GNR UE 410 for wireless data services that are represented by Access Point Names (APNs). LTE MME 431 generates a B1 measurement object for 5GNR/LTE UE 410 in response to the 5G UE capabilities and the UE authorization. The B1 measurement object may specify frequency bands for UE 410 to measure and/or other parameters for UE 410 to measure when establishing duel connectivity. LTE MME 431 transfers the APNs for UE 410 to SAE GW 432. SAE GW 432 interacts with LTE PCRF 433 to select Quality-of-Service Class Identifiers (QCIs) and network addresses for UE 410 based on the APNs. SAE GW 432 transfers the APNs, QCIs, and network addresses for UE 410 to LTE MME 431. MME 431 transfers the APNs, QCIs, network address, and the B1 measurement object for UE 410 to LTE eNodeB 421. LTE SAE GW 432 exchanges user data for UE 410 with external systems. SAE GW 432 exchanges the user data with LTE eNodeB 421. LTE eNodeB 421 transfers the APNs, QCIs, network address, and the B1 measurement object to UE 410. LTE eNodeB 421 exchanges the user data with UE 410.

In response to the B1 measurement object, UE 410 measures the signal strength of the reference signal from 5GNR gNodeB 422. UE 410 generates a measurement report that characterizes the signal strength and transfers the measurement report to LTE eNodeB 421. LTE eNodeB 421 determines a cell site density for the geographic region of UE 410. For example, LTE eNodeB 421 may direct UE 410 to report all detected PCIs and may determine cell site density based on the number of reported PCIs. In other examples, LTE eNodeB 421 may determine the location of UE 410 and request PCIs from MME 431 for each access node associated with the location of UE 410 to determine cell site density. LTE eNodeB 421 determines a B1 addition threshold for 5GNR gNodeB 422 based on cell site density for the geographic region of UE 410. In some examples, LTE eNodeB 421 implements a data structure that correlates cell site densities to B1 addition thresholds to select B1 thresholds for 5GNR gNodeB 422. Typically, LTE eNodeB 421 selects a high B1 addition threshold when the cell site density is high and selects a low B1 addition threshold when the cell site density is low.

LTE eNodeB 421 determines a frequency offset and hysteresis for 5GNR gNodeB 422. LTE eNodeB 421 determines an inter Radio Access Technology (RAT) addition value for 5GNR gNodeB 422 based on the measurement report received from UE 410. Typically, the inter-RAT addition value comprises a sum of the signal strength, the frequency offset, and the hysteresis. LTE eNodeB 421 determines when the inter-RAT addition value for 5GNR gNodeB 422 is greater than the B1 addition threshold for 5GNR gNodeB 422. When the inter-RAT addition value is greater than the B1 addition threshold for 5GNR gNodeB 422, LTE eNodeB 421 directs 5GNR gNodeB 422 to serve UE 410 and directs UE 410 to attach to 5GNR gNodeB 422. LTE eNodeB 421 notifies LTE MME 431 and LTE MME 431 directs SAE GW 432 to serve UE 410 over 5GNR gNodeB 422. In response, LTE SAE GW 432 exchanges user data for UE 410 with 5GNR gNodeB 422. 5GNR gNodeB 422 exchanges the user data with UE 410.

In some examples, LTE eNodeB 421 determines a B1 drop threshold for 5GNR gNodeB 422 based on the cell site density for 5GNR gNodeB 422. The B1 drop threshold may comprise a different threshold value than the B1 addition threshold. LTE eNodeB 421 receives a subsequent 5GNR signal strength measurement for 5GNR gNodeB 422 from UE 410. LTE eNodeB 421 determines an inter-RAT drop value for 5GNR gNodeB 422 based on the sum of the subsequent signal strength, the frequency offset, and the hysteresis. When the inter-RAT drop value for 5GNR gNodeB 422 is lower than the B1 drop threshold for 5GNR gNodeB 422, LTE eNodeB 421 signals 5GNR gNodeB 422 to stop serving UE 410 and signals UE 410 to detach from 5GNR gNodeB 422. LTE MME 431 directs LTE SAE GW 432 to stop serving UE 410 over 5GNR gNodeB 422. In response, LTE SAE GW 432 stops exchanging the user data for UE 410 with 5GNR gNodeB 422. 5GNR gNodeB 422 stops exchanging the user data with UE 410.

In some examples, LTE eNodeB 421 determines the B1 addition threshold for 5GNR gNodeB 422 based on cell site density and packet Round Trip Time (RTT). LTE eNodeB 421 may send a data packet echo request to 5GNR gNodeB 422 to determine RTT for 5GNR gNodeB 422. For example, LTE eNodeB 421 may measure the length of time a data packet travels to 5GNR gNodeB 422 and back to LTE eNodeB 421 to determine RTT. LTE eNodeB 421 typically selects higher B1 addition thresholds when the RTT for an access node is high and selects lower B1 addition thresholds when the RTT an access node is low. LTE eNodeB 421 may implement a data structure that correlates RTTs to B1 addition thresholds. LTE eNodeB 421 may determine an aggregate B1 addition threshold for 5GNR gNodeB 421 by averaging the B1 addition threshold based on cell site density and the B1 addition threshold based on RTT. In some examples, LTE eNodeB 421 may reselect the B1 addition threshold based on cell site density after determining the RTT for 5GNR gNodeB 422.

In some examples, LTE eNodeB 421 determines B1 thresholds based on whether an access node is a Stand Alone (SA) access node or a Non-Stand Alone (NSA) access node. A SA access node comprises an access node capable of serving a UE by itself. In contrast, an NSA access node comprises an access node that requires an additional access node to facilitate wireless communication between the NSA node and a UE. LTE eNodeB 421 may determine if 5GNR gNodeB 422 comprises an NSA node or an SA node. LTE eNodeB 421 decreases B1 addition thresholds for SA access nodes and increases B1 addition thresholds for NSA access nodes.

In some examples, LTE eNodeB 421 performs dynamic bandwidth sharing with 5GNR gNodeB 422. Dynamic bandwidth sharing comprises transferring resource blocks between different frequency channels. For example, LTE eNodeB 421 may transfer resource blocks from a frequency channel used by LTE eNodeB 421 to a frequency channel used by 5GNR gNodeB 422 to increase the frequency channel size for 5GNR gNodeB 422. Typically, LTE eNodeB 421 will perform dynamic bandwidth sharing when either LTE eNodeB 421 or 5GNR gNodeB 422 becomes overloaded.

Note that 5GNR gNodeB 423 and 5G MMW node 424 use different types of 5G Radio Access Technology (RAT). The different types of 5G RAT may have different frequency channel sizes, frequency levels, resource block time intervals, and resource block bandwidths. For example, 5GNR gNodeB 423 may provide an enhanced voice calling service with unique time intervals and bandwidths while MMW node 424 may provide an enhanced video broadcast service with unique time intervals and bandwidths while. Some 5GNR UEs are not capable of using each type of 5G RAT from 5GNR gNodeB 423 and 5G MMW node 424, but 5GNR UE 411 is capable of using each type of 5G RAT.

In operation, 5GNR UE 411 attaches to 5GNR gNodeB 423 and indicates its 5G capabilities for multiple types of 5G RAT and its location. 5GNR gNodeB 423 requests data service from 5GC AMF 435 and indicates the 5G capabilities for UE 411 to 5GC AMF 425 over N2 signaling. 5GC AMF 435 interacts with 5GC SMF 437, 5GC AUSF 438, 5GC UDM 440, and 5GC PCF 439 to authenticate and authorize 5GNR UE 411 for 5G data services. 5GC AMF 435 generates a 5GNR measurement object in response to the 5G UE capabilities and the 5G authorization. The 5GNR measurement object may specify frequency bands for UE 411 to measure when establishing duel connectivity or other parameters for UE 411 to establish duel connectivity. 5GC AMF 435 transfers quality-of-service metrics, network addressing, and the 5GNR measurement object for UE 411 to 5GNR gNodeB 423 and 5GC SMF 437. 5GC SMF 437 directs 5GC UPF 436 to serve UE 411 per the quality-of-service metrics and network addressing over 5GNR gNodeB 423. 5GNR gNodeB 423 transfers the selected APNs, QCIs, network addresses, and 5GNR measurement object to UE 411. 5GNR gNodeB 423 exchanges user data with UE 411.

In response to the 5GNR measurement object, UE 411 measures the signal strength of the reference signal from 5G MMW node 424. UE 411 generates a measurement report that characterizes the signal strength for 5G MMW node 424 and transfers the measurement report to 5GNR gNodeB 423. 5GNR gNodeB 423 determines the location of UE 411 and the cell site density associated with the location of UE 411. For example, 5GNR gNodeB 423 may request PCIs from AMF 425 that indicate access nodes associated with the location of UE 411 and determine cell site density based on the number of reported PCIs. 5GNR gNodeB 423 determines an inter-RAT addition threshold for 5G MMW node 424 based on the cell site density associated with the location of UE 411. In some examples, 5GNR gNodeB 423 implements a data structure that correlates cell site densities to inter-RAT addition thresholds to select inter-RAT thresholds for 5G MMW node 424. Typically, 5GNR gNodeB 423 selects a high inter-RAT addition threshold when the cell site density is high. Conversely, 5GNR gNodeB 423 selects a low inter-RAT addition threshold when the cell site density is low.

5GNR gNodeB 423 determines a frequency offset and hysteresis for 5G MMW node 424. 5GNR gNodeB 423 determines an inter-RAT addition value for 5G MMW node 424 based on the measurement report received from UE 410. Typically, the inter-RAT addition value comprises a sum of the signal strength, the frequency offset, and the hysteresis for MMW node 424. 5GNR gNodeB 423 determines when the inter-RAT addition value for 5G MMW node 424 is greater than the inter-RAT addition threshold for 5G MMW node 424. When the inter-RAT addition value is greater than the inter-RAT addition threshold, 5GNR gNodeB 423 directs 5G MMW node 424 to serve UE 411 and directs UE 411 to attach to 5G MMW node 424. 5GNR gNodeB 423 notifies 5GC AMF 435 of the attachment. 5GC AMF 435 directs 5GC SMF 437 to direct 5GC UPF 436 to serve UE 411 per the quality-of-service metrics and network addressing over 5G MMW node 424. 5GNR UE 411 attaches to 5G MMW node 424 and 5G MMW node 424 exchanges user data with UE 411.

In some example, 5GNR gNodeB 423 also determines an inter-RAT drop threshold for 5G MMW node 424 based on the cell site density. 5GNR gNodeB 423 receives subsequent signal strength measurements for 5G MMW node 424 from UE 411. 5GNR gNodeB 423 determines an inter-RAT drop value for 5G MMW node 424 based on the subsequent signal strength for 5G MMW node 424, the frequency offset, and the hysteresis. When the inter-RAT drop value for MMW node 424 is lower than the inter-RAT drop threshold for MMW node 424, 5GNR gNodeB 423 signals UE 411 to detach from 5G MMW node 424 and 5G MMW node 424 stops exchanging the user data with UE 411.

In some examples, 5GNR gNodeB 423 determines the inter-RAT addition threshold for 5G MMW node 424 based on cell site density and packet Round Trip Time (RTT). 5GNR gNodeB 423 may send a data packet echo request to 5G MMW node 424 to determine RTT for 5G MMW node 424. For example, 5GNR gNodeB 423 may measure the length of time a data packet travels to 5G MMW node 424 and back to 5GNR gNodeB 423 to determine RTT. 5GNR gNodeB 423 typically selects higher inter-RAT addition thresholds when the RTT for an access node is high and selects lower inter-RAT addition thresholds when the RTT for an access node is low. 5GNR gNodeB 423 may implement a data structure that correlates RTTs to inter-RAT addition thresholds. 5GNR gNodeB 423 may determine an aggregate inter-RAT addition threshold for 5G MMW node 424 by averaging the inter-RAT addition threshold based on cell site density and the inter-RAT addition threshold based on RTT. In some examples, 5GNR gNodeB 423 may reselect the inter-RAT addition threshold based on cell site density after determining the RTT for 5G MMW node 424.

In some examples, 5GNR gNodeB 423 determines inter-RAT addition thresholds based on whether an access node is a Stand Alone (SA) access node or a Non-Stand Alone (NSA) access node. A SA access node comprises an access node capable of serving a UE by itself. In contrast, an NSA access node comprises an access node that requires an additional access node to facilitate wireless communication between the NSA node and a UE. 5GNR gNodeB 423 may determine if 5G MMW node 424 comprises an NSA node or an SA node. 5GNR gNodeB 423 selects low inter-RAT addition thresholds for SA access nodes and high inter-RAT addition thresholds for NSA access nodes.

In some examples, 5GNR gNodeB 423 performs dynamic bandwidth sharing with 5G MMW node 424. Dynamic bandwidth sharing comprises transferring resource blocks between different frequency channels. For example, 5GNR gNodeB 423 may transfer resource blocks from a frequency channel used by 5GNR gNodeB 423 to a frequency channel used by 5G MMW node 424 to increase the frequency channel size for 5GNR gNodeB 422. Typically, 5GNR gNodeB 423 will perform dynamic bandwidth sharing when either 5GNR gNodeB 423 or 5G MMW node 424 becomes overloaded.

In some examples, UEs 410-411 determine cell site densities for 5GNR gNodeB 422 and MMW node 424 as described above for LTE eNodeB 421 and 5GNR gNodeB 423. UEs 410-411 may detect PCIs from available wireless access nodes including 5GNR gNodeB 422 and 5G MMW node 424. UEs 410-411 may determine a cell site density based on the number of detected PCIs and report the determined cell site densities to EN-DC node 420 and to 5GNR gNodeB 423 to trigger threshold events based on the reported cell site densities.

Advantageously, LTE eNodeB 421 effectively and efficiently selects B1 thresholds based on cell site density to serve UEs over multiple wireless links. Likewise, 5GNR gNodeB 423 effectively and efficiently selects inter-RAT thresholds based on cell site density to serve UEs over multiple wireless links.

Figure 5:
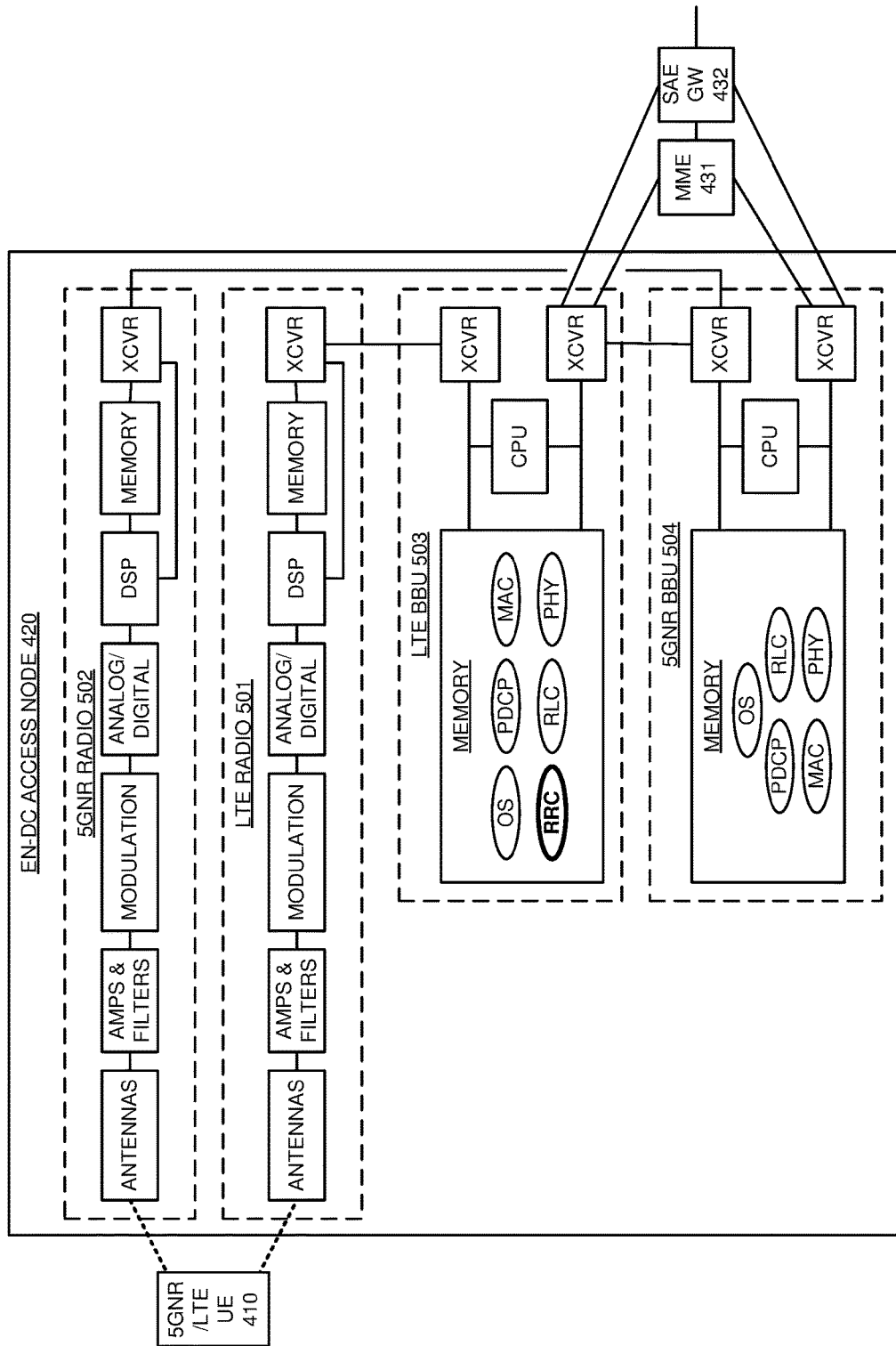
FIG. 5 illustrates an Evolved Universal Terrestrial Radio Access Network Dual Connectivity (EN-DC) access node to serve a 5GNR/LTE UE over multiple wireless links based on cell site density.

FIG. 5 illustrates EN-DC access node 420 to provide wireless communications service to UE 410 over multiple wireless links based on cell site density. EN-DC access node 420 is an example of primary access node 120, although primary access node 120 may differ. As shown in FIG. 4, EN-DC access node 420 includes LTE eNodeB 421 and 5GNR gNodeB 422, however individual structures for LTE eNodeB 421 and 5GNR gNodeB 422 are omitted for clarity. EN-DC access node 420 comprises LTE radio 501, 5GNR radio 502, LTE Baseband Unit (BBU) 503, and 5GNR BBU 504. Radios 501-502 comprise antennas, amplifiers, filters, modulation, analog-to-digital interfaces, DSP, memory, and transceivers (XCVR) that are coupled over bus circuitry. BBUs 503-504 comprise memory, CPU, and transceivers that are coupled over bus circuitry. The memories in BBUs 503-504 store operating systems (OS) and network applications like Physical Layer (PHY), Media Access Control (MAC), Radio Link Control (RLC), Packet Data Convergence Protocol (PDCP), and Radio Resource Control (RRC). The CPUs in BBUs 503-504 execute the operating systems, PHYs, MACs, RLCs, PDCPs, and RRCs to exchange network signaling between UE 410 and MME 431 and to exchange user data between UE 410 and SAE GW 432.

RRC functions comprise authentication, security, handover control, status reporting, Quality-of-Service (QoS), network broadcasts and pages, and network selection. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

UE 410 is wirelessly coupled to the antennas in LTE radio 501 over an LTE link. The transceiver in LTE radio 501 is coupled to a transceiver in LTE BBU 503 over Common Public Radio Interface (CPRI) links. A transceiver in LTE BBU 503 is coupled to MME 431 and SAE GW 432 over backhaul links. UE 410 is wirelessly coupled to the antennas in 5GNR radio 502 over an 5GNR link. The transceiver in 5GNR radio 502 is coupled to a transceiver in 5GNR BBU 504 over CPRI links. A transceiver in 5GNR BBU 504 is coupled to MME 431 and to SAE GW 432 over backhaul links. A transceiver in LTE BBU 503 is coupled to a transceiver in 5GNR BBU 504 over X2 links.

In operation, UE 410 wirelessly attaches to LTE antennas in LTE radio 501. The LTE antennas in LTE radio 501 receive wireless LTE signals from UE 410 that transport Uplink (UL) LTE signaling, UL LTE data. The UL signaling indicates 5GNR capabilities for UE 410 and the location of UE 410. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL LTE symbols from the UL digital signals. The CPUs execute the network applications to process the UL LTE symbols and recover the UL LTE signaling and the UL LTE data. The RRC processes the UL LTE signaling and Downlink (DL) S1-MME signaling to generate new UL S1-MME signaling and new DL LTE signaling. The RRC transfers the new UL S1-MME signaling, including the 5GNR capabilities of UE 410, to MME 431 over the backhaul links. MME 431 authenticates and authorizes 5GNR service for UE 410. In response to the authentication and authorization, MME 431 generates a B1 measurement object specifying frequency bands for UE 410 to measure. In LTE BBU 503, the LTE RRC receives the DL S1-MME signaling including the B1 measurement object from MME 431. The LTE PDCP transfers the UL LTE data to LTE SAE GW 432 over the backhaul links. The LTE PDCP receives DL LTE data from SAE GW 432.

The LTE network applications process the new DL LTE signaling and the DL LTE data to generate corresponding DL LTE symbols that carry the DL LTE signaling, DL LTE data, and the B1 measurement object. In LTE radio 501, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling, DL LTE data, and B1 measurement object to UE 410.

In response to the B1 measurement object, UE 410 measures signal strength of the reference signal for SGNR BBU 504. UE 410 wirelessly transfers a measurement report that characterizes the SGNR signal strength for BBU 504 to LTE radio 501. In some examples, UE 410 detects Physical Cell Identifies (PCIs), including the PCI for BBU 504, and wirelessly transfers a measurement report that characterizes the SGNR signal strength and the detected PCIs. LTE radio 501 transfers the measurement report to LTE BBU 503 over the CPRI links.

The LTE RRC in LTE BBU 503 determines the location of UE 410 and determines the cell site density associated with the location of UE 410. For example, the LTE RRC may retrieve the cell site density from memory, determine cell site density based on the number of CDIs reported by UE 410, request cell site density for the location of UE 410 from MME 431, and/or determine cell site density by some other method. The LTE RRC also determines data packet Round Trip Time (RTT) for SGNR BBU 504. The LTE RRC in BBU 503 directs the LTE PDCP to transfer a data packet echo request to the SGNR PDCP in BBU 504. The LTE PDCP exchanges a data packet with the SGNR PDCP over X2-User (X2-U) links. The LTE PDCP reports the amount of time that elapsed between sending the data packet to the SGNR PDCP and receiving the data packet from the 5GNR PDCP to the LTE RRC. The LTE RRC determines an X2-U RTT for 5GNR BBU 504 based on the amount of elapsed time.

The LTE RRC in LTE BBU 503 determines a B1 add threshold for 5GNR BBU 504 based on the cell site density for the location of UE 410 and the X2-U RTT for 5GNR BBU 504. The LTE RRC may implement a data structure that correlates cell site densities and RTTs to B1 addition thresholds to determine the B1 add threshold for 5GNR BBU 504. Typically, the LTE RRC selects high B1 thresholds when the cell site density is high and/or the RTT is high and selects low B1 thresholds when the cell site density is low and/or the RTT is low. In some examples, the LTE RRC may augment a B1 threshold based on cell site density after determining RTT for 5GNR BBU 504. For example, the LTE RRC may increase the B1 threshold for 5GNR BBU 504 after determining the X2-U RTT for 5GNR BBU 504 is high.

The LTE RRC in LTE BBU 503 determines frequency offset and hysteresis for 5GNR BBU 504. The LTE RRC in BBU 503 determines an inter-RAT add value for 5GNR BBU 504 based on the sum of the signal strength, the frequency offset, and the hysteresis for 5GNR BBU 504. In some examples, the LTE RRC in BBU 503 implements a data structure to convert reported signal strength into an add value for 5GNR BBU 503. The LTE RRC in BBU 503 determines when the inter-RAT add value is greater than the B1 add threshold. When the inter-RAT add value for 5GNR BBU 504 exceeds the B1 add threshold for 5GNR BBU 504, the LTE RRC in BBU 503 directs the 5GNR PDCP in 5GNR BBU 504 to serve UE 410. The LTE RRC in BBU 503 also directs UE 410 to attach to the 5GNR PDCP in 5GNR BBU 504 over LTE radio 501. UE 410 attaches to the 5GNR PDCP in BBU 504 over 5GNR radio 502. The LTE RRC in BBU 503 notifies MME 431 of the 5GNR attachment. MME 431 directs SAE GW 432 to serve UE 410 over 5GNR BBU 504. SAE GW 432 exchanges 5GNR data with the 5GNR PDCP in 5GNR BBU 504. The 5GNR PDCP in BBU 504 exchanges the 5GNR data with the 5GNR PDCP in UE 410 over the RLCs, MACs, and PHYs.

In 5GNR radio 502, the antennas receive wireless 5GNR signals from UE 410 that transport Uplink (UL) 5GNR signaling and UL 5GNR data. The antennas in 5GNR radio 502 transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL 5GNR symbols from the UL digital signals. The CPUs execute the network applications to process the UL 5GNR symbols and recover the UL 5GNR signaling and the UL 5GNR data. The 5GNR PDCP processes the UL 5GNR signaling and DL X2 signaling from the LTE RRC in LTE BBU 503 to generate new UL X2 signaling and new DL 5GNR signaling. The 5GNR PDCP transfers the new UL X2 signaling to the LTE RRC in BBU 503. The 5GNR PDCP transfers the UL 5GNR data to SAE GW 432 over backhaul links.

In 5GNR BBU 504, the 5GNR PDCP receives the DL X2 signaling from the LTE RRC in BBU 503. The 5GNR PDCP also receives DL 5GNR data from SAE GW 432. The 5GNR network applications process the new DL 5GNR signaling and the DL 5GNR data to generate corresponding DL 5GNR symbols that carry the DL 5GNR signaling and DL 5GNR data. In 5GNR radio 502, the DSPs process the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas in 5GNR radio 502 to emit corresponding wireless 5GNR signals that transport the DL 5GNR signaling and DL 5GNR data to UE 410.

In this example, the LTE RRC in LTE BBU 503 also determines a B1 drop threshold for 5GNR BBU 504 based on the cell site density for the location of UE 410. The LTE RRC in BBU 503 wirelessly receives a subsequent measurement report that characterizes 5GNR signal strength for 5GNR BBU 504 from UE 410. The LTE RRC in LTE BBU 503 determines an inter-RAT drop value for 5GNR BBU 504 based on the subsequent signal strengths, the frequency offsets, and the hysteresis. The LTE RRC in LTE BBU 503 stops the service to UE 410 over 5GNR radio 502 when the inter-RAT drop value for 5GNR BBU 504 is less than the B1 drop threshold for 5GNR BBU 504. When the inter-RAT drop value for 5GNR BBU 504 is less than the B1 drop threshold, the LTE RRC in LTE BBU 503 directs the 5GNR PDCP in BBU 504 to stop serving UE 410 and notifies MME 431. The LTE RRC in LTE BBU 503 directs UE 410 to detach from 5GNR PDCP in 5GNR BBU 504. UE 410 wirelessly detaches from 5GNR BBU 504. MME 431 directs SAE GW 432 to stop serving UE 410 over 5GNR BBU 504. SAE GW 432 stops exchanging 5GNR data with the 5GNR PDCP in 5GNR BBU 504. The 5GNR PDCP in BBU 504 stops exchanging the 5GNR data with the 5GNR PDCP in UE 410 over the RLCs, MACs, and PHYs.

Figure 6:
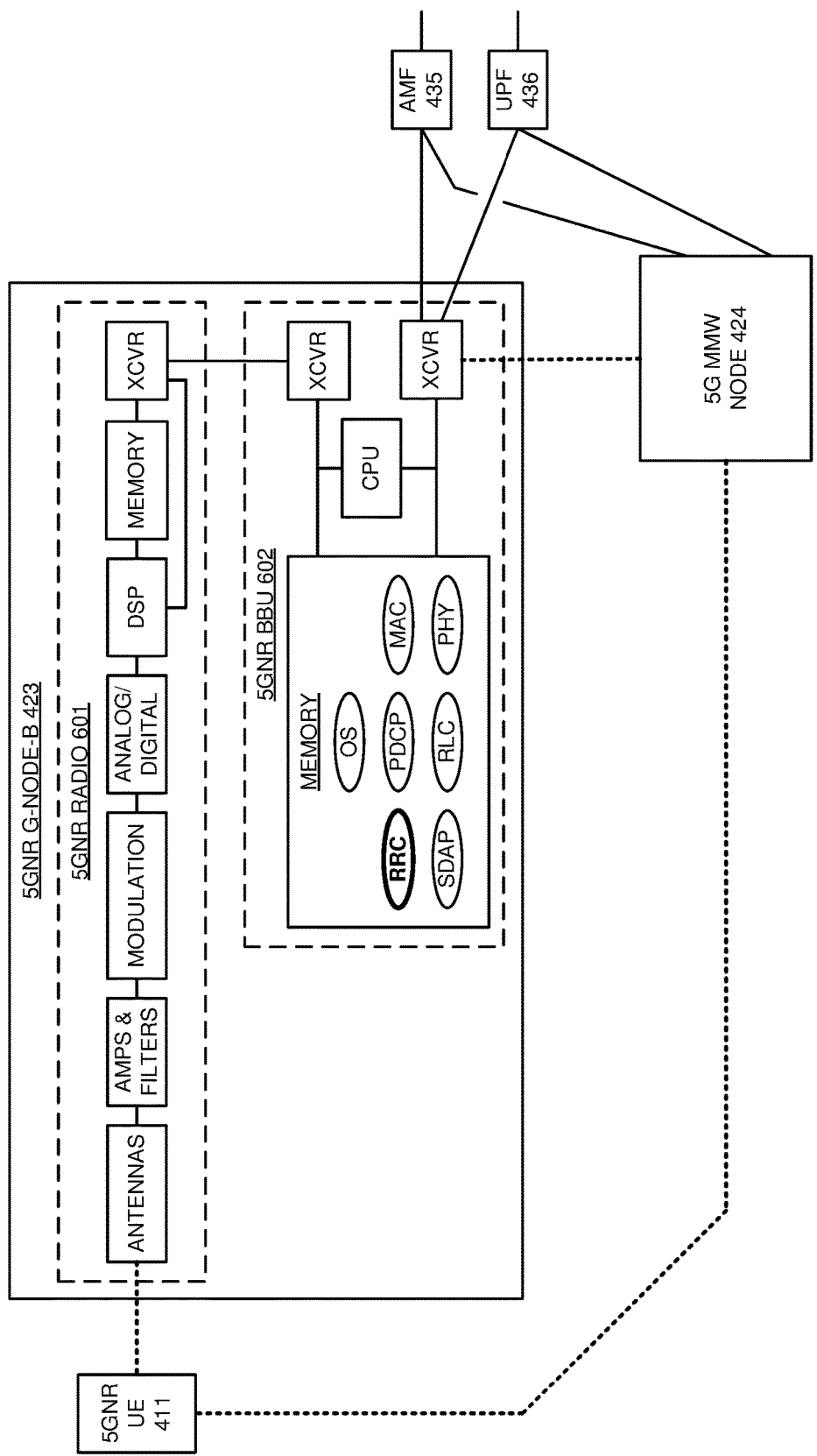
FIG. 6 illustrates a 5GNR gNodeB to serve 5GNR UE over multiple wireless links based on cell site density.

FIG. 6 illustrates 5GNR gNodeB 423 to serve 5GNR UE 411 over multiple wireless links based on cell site density. 5GNR gNodeB 423 is an example of primary access node 120, although access node 120 may differ. 5GNR gNodeB 423 comprises 5GNR radio 601 and 5GNR BBU 602. 5GNR radio 601 comprises antennas, amplifiers, filters, modulation, analog-to-digital interfaces, DSP, memory, and transceivers that are coupled over bus circuitry. 5GNR UE 411 is wirelessly coupled to the antennas in 5GNR radio 601 over a 5GNR link. The transceiver in 5GNR radio 601 is coupled to a transceiver in 5GNR BBU 602 over CPRI links. A transceiver in 5GNR BBU 602 is coupled to AMF 435 and UPF 436 over backhaul links. A transceiver in 5GNR BBU 602 is coupled to 5G MMW node 424 of X2 links. 5GNR BBU 602 comprises memory, CPU, and transceivers that are coupled over bus circuitry. The memory in BBU 602 stores operating systems and network applications like PHY, MAC, RLC, PDCP, RRC, and Service Data Adaptation Protocol (SDAP). The CPU in BBU 602 executes the operating systems, PHYs, MACs, RLCs, PDCPs, SDAPs, and RRCs to exchange network signaling with 5GNR UE 411 and AMF 435 and to exchange user data between 5GNR UE 411 and UPF 436.

RRC functions comprise authentication, security, handover control, status reporting, QoS, network broadcasts and pages, and network selection. SDAP functions comprise QoS marking and flow control. PDCP functions comprise LTE/5GNR allocations, security ciphering, header compression and decompression, sequence numbering and re-sequencing, and de-duplication. RLC functions comprise ARQ, sequence numbering and resequencing, and segmentation and resegmentation. MAC functions comprise buffer status, power control, channel quality, HARQ, user identification, random access, user scheduling, and QoS. PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, precoding, DFTs/IDFTs, and RE mapping/de-mapping.

In operation, 5GNR UE 411 wirelessly attaches to 5GNR radio 601. In 5GNR radio 601, the antennas receive wireless 5GNR signals from 5GNR UE 411 that transport UL 5GNR signaling and UL 5GNR data. The 5G UL signaling from UE 411 indicates 5G capabilities for UE 411 and the location of UE 411. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSP. The DSP recovers UL 5GNR symbols from the UL digital signals. The CPUs execute the network applications to process the UL 5GNR symbols and recover the UL 5GNR signaling and the UL 5GNR data. The 5G RRC in 5GNR BBU 602 processes the UL 5GNR signaling and DL N2 signaling from AMF 435 to generate new UL N2 signaling and new DL 5GNR signaling. The 5GNR RRC transfers the new UL N2 signaling to AMF 435. The 5GNR SDAP in 5GNR BBU 602 transfers the UL 5GNR data to UPF 436 over backhaul links.

5GC AMF 435 interacts with 5GC SMF 437, 5GC AUSF 438, 5GC UDM 440, and 5GC PCF 439 to authenticate and authorize 5GNR UE 411 for 5G MMW services. 5GC AMF 435 generates a 5GNR measurement object for 5GNR UE 411 responsive to the 5G UE capabilities and the authorization. The 5GNR measurement object specifies frequencies for 5GNR UE 411 to measure when establishing duel connectivity. 5GC AMF 435 transfers the quality-of-service metrics, network addressing to 5GC SMF 437 and transfers the quality-of-service metrics, network addressing and 5GNR measurement object for UE 411 to the 5GNR RRC in BBU 502. 5GC SMF 437 directs 5GC UPF 436 to serve UE 411 per the quality-of-service metrics and network addressing over 5GNR gNodeB 423.

In 5GNR BBU 602, the 5GNR RRC receives the DL N2 signaling from AMF 435. The 5GNR SDAP receives DL 5GNR data from UPF 436. The 5GNR network applications process the new DL 5GNR signaling and the DL 5GNR data to generate corresponding DL 5GNR symbols that carry the DL 5GNR signaling and DL 5GNR data. In 5GNR radio 601, the DSP processes the DL 5GNR symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL 5GNR signaling, DL 5GNR data, and 5GNR measurement object to 5GNR UE 411.

In response to the 5GNR measurement object, UE 411 measures signal strength of the reference signal for 5G MMW node 424. UE 411 wirelessly transfers a measurement report that characterizes the signal strength for 5G MMW node 424 to 5GNR radio 601. In some examples, UE 411 detects Physical Cell Identifies (PCIs), including the PCI for 5G MMW node 424, and wirelessly transfers a measurement report that characterizes the signal strength and the detected PCIs. 5GNR radio 601 transfers the measurement report to 5GNR BBU 602 over the CPRI links.

The 5GNR RRC in 5GNR BBU 602 determines the location of UE 411 and determines the cell site density associated with the location of UE 411. For example, the 5GNR RRC may retrieve the cell site density from memory, determine cell site density based on the number of CDIs reported by UE 411, request cell site density for the location of UE 411 from AMF 435, and/or determine cell site density by some other method. The 5GNR RRC also determines data packet Round Trip Time (RTT) for 5G MMW node 424. The 5GNR RRC in BBU 602 sends a data packet echo request to 5G MMW node 424 and directs the 5GNR PDCP to transfer a data packet echo request to 5G MMW node 424. The 5GNR PDCP exchanges a data packet with 5G MMW node 424 over X2-U links. The 5GNR RRC exchanges a data packet with 5G MMW node 424 over X2-Control (X2-C) links. The 5GNR PDCP reports the amount of time that elapsed between sending the data packet to 5G MMW node 424 and receiving the data packet from 5G MMW node 424 to the 5GNR RRC. The 5GNR RRC measures the amount of time that elapsed between the 5GNR RRC sending the data packet to 5G MMW node 424 and receiving the data packet from 5G MMW node 424. The LTE RRC determines an X2-U RTT and an X2-C RTT for 5G MMW node 424 based on the amount of elapsed time.

The 5GNR RRC in 5GNR BBU 602 determines an inter-RAT add threshold for 5G MMW node 424 based on the cell site density for the location of UE 411, the X2-U RTT for 5G MMW node 424, and the X2-C RTT for 5G MMW node 424. The 5GNR RRC may implement a data structure that correlates cell site densities and RTTs to inter-RAT addition thresholds to determine the inter-RAT add threshold for 5G MMW node 424. Typically, the 5GNR RRC selects high B1 thresholds when the cell site density is high and/or the RTT is high and selects low B1 thresholds when the cell site density is low and/or the RTT is low. In some examples, the 5GNR RRC may augment a B1 threshold based on cell site density after determining RTT for 5G MMW node 424. For example, the LTE RRC may decrease the B1 threshold for 5G MMW node 424 after determining the X2-C RTT for 5G MMW node 424 is low.

The 5GNR RRC in BBU 602 determines frequency offset and hysteresis for 5G MMW node 424. The 5GNR RRC determines an inter-RAT addition value for 5G MMW node 424 based on the signal strength for 5G MMW node 424, the frequency offset, and the hysteresis. In some examples, the 5GNR RRC implements a data structure that correlates signal strengths to inter-RAT add values to determine the inter-RAT add value for 5G MMW node 424. The 5GNR RRC in BBU 602 determines when the inter-RAT addition value is greater than the inter-RAT addition threshold for 5G MMW access node 424. When the inter-RAT addition value for 5G MMW node 424 is greater than the inter-RAT addition threshold for 5G MMW node 424, the 5GNR RRC in BBU 602 directs 5G MMW node 424 to serve UE 411 and directs UE 411 to attach to 5G MMW node 424. The 5GNR RRC in 5GNR BBU 602 notifies 5GC AMF 435 of the attachment and 5GC AMF 435 directs 5GC SMF 437 to direct 5GC UPF 436 to serve UE 411 per the quality-of-service metrics and network addressing over 5G MMW node 424. 5GNR UE 411 attaches to 5G MMW node 424. 5G MMW node 424 exchanges user data with UE 411.

The 5GNR RRC in BBU 602 also determines an inter-RAT drop threshold for 5G MMW node 424 based on the cell site density for the location of UE 411. The 5GNR RRC in BBU 602 receives a subsequent measurement report from UE 411 that characterizes the signal strength for 5G MMW node 424. The 5GNR RRC in BBU 602 determines an inter-RAT drop value for 5G MMW node 424 based on the subsequent signal strength for 5G MMW node 424, the frequency offset, and the hysteresis. When the drop value for 5G MMW node 424 is lower than the drop threshold 5G MMW node 424, the 5GNR RRC in BBU 602 signals UE 411 to detach from 5G MMW node 424 and 5G MMW node 424 stops exchanging the user data with UE 411.

Figure 7:
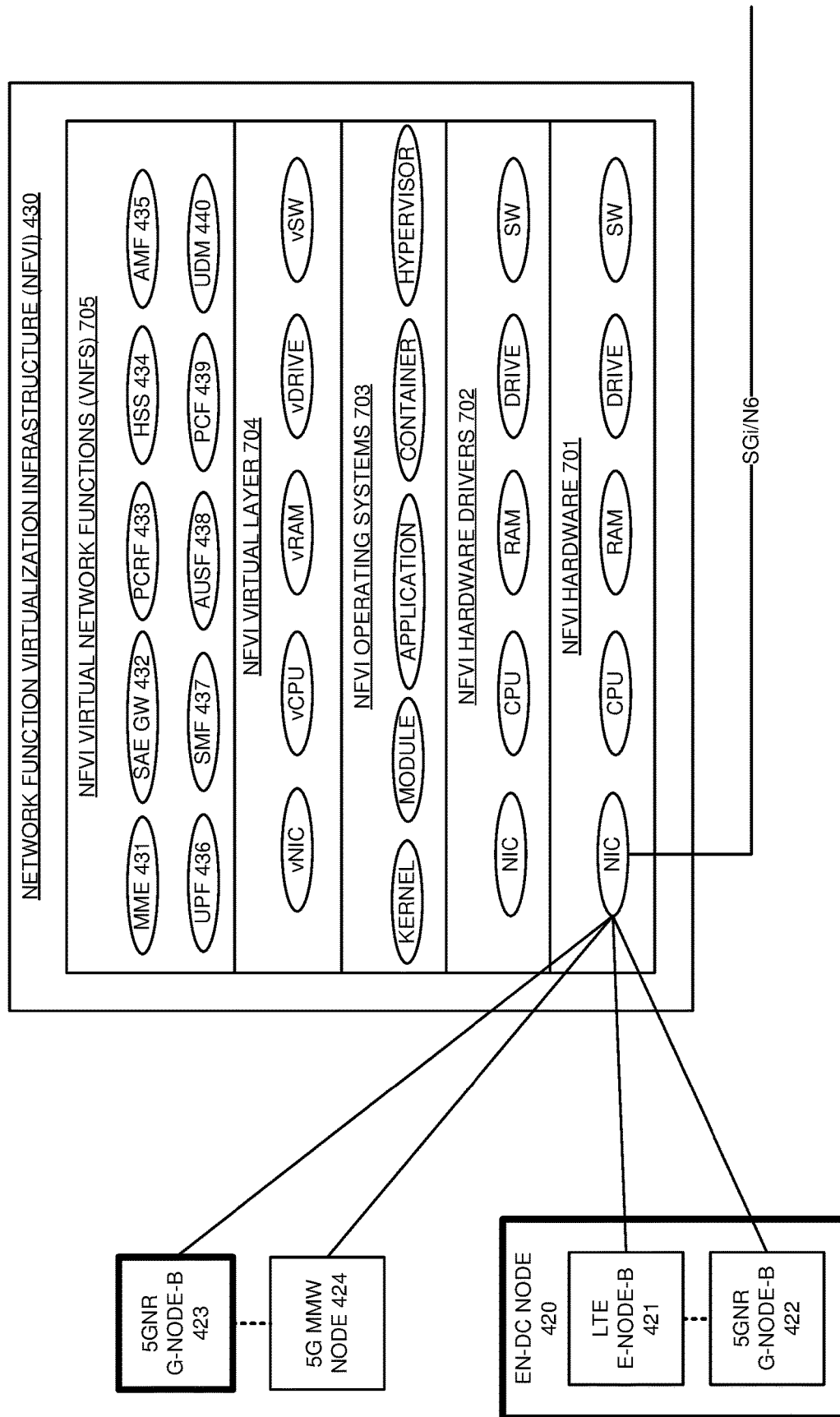
FIG. 7 illustrates a Network Function Virtualization Infrastructure (NFVI) to serve UEs over multiple wireless links based on cell site density.

FIG. 7 illustrates Network Function Virtualization Infrastructure (NFVI) 430 to serve UEs 410-411 over multiple wireless links based on cell site density. NFVI 430 is an example of network elements 150, although network elements 150 may differ. NFVI 430 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise MME 431, SAE GW 432, PCRF 433, HSS 434, AMF 435, UPF 436, SMF 437, AUSF 438, PCF 439, and UDM 440. Other LTE VNFs and 5GC VNFs are typically present but are omitted for clarity. The NIC is coupled to EN-DC node 420, SGNR gNodeB 423, 5G MMW node 424, and to external systems. NFVI hardware 701 executes NFVI hardware drivers 702, NFVI operating systems 703, NFVI virtual layer 704, and NFVI VNFs 705 to serve UEs 410-411 over EN-DC node 420, SGNR gNodeB 423, and 5G MMW node 424.

MME 431 receives S1-MME signaling from LTE eNodeB 421 that requests data services for UE 410 and indicates 5G capabilities for UE 410. MME 431 interacts with HSS 434 to authenticate and authorize UE 410 for wireless data services that are represented by APNs. In response to the 5G UE capabilities and the authorization MME 431 generates a B1 measurement object for UE 410 that specifies frequencies for UE 410 to measure when establishing duel connectivity. In some examples, the B1 measurement object may specify additional parameters for UE 410 to measure when establishing duel connectivity. For example, the B1 measurement object may direct UE to report all detected PCIs during measurement. MME 431 transfers the APNs for UE 410 to SAE GW 432. SAE GW 432 interacts with PCRF 433 to select QCIs and network addresses for UE 410 based on the APNs. SAE GW 432 transfers the APNs, QCIs, and network addresses to MME 431. MME 431 transfers the APNs, QCIs, network addresses, and B1 measurement object for UE 410 to LTE eNodeB 421. MME 431 receives S1-MME signaling from LTE eNodeB 421 for UE 410. SAE GW 432 exchanges user data for UE 410 with external systems. SAE GW 432 exchanges the user with LTE eNodeB 421 and 5GNR gNodeB 422.

AMF 435 receives N2 signaling from 5GNR gNodeB 423 that requests data service for UE 411 and indicates 5G capabilities for UE 411. AMF 435 interacts with SMF 437, AUSF 438, PCF 439, and UDM 440 to authenticate and authorize 5GNR UE 411 for 5G data services. AMF 435 generates a 5GNR measurement object responsive to the 5G UE capabilities and the authorization that specifies frequencies for UE 411 to measure when establishing duel connectivity. In some examples, the 5GNR measurement object may specify additional parameters for UE 411 to measure when establishing duel connectivity. AMF 435 transfers quality-of-service metrics, network addressing, and the 5GNR measurement object for 5GNR UE 411 to 5GNR gNodeB 423. AMF 436 receives N2 signaling from 5GNR gNodeB 423 indicating the attachments. AMF 435 directs SMF 437 drive UPF 436 to serve UE 411 over 5G MMW node 424 per the quality-of-service metrics and network addressing. SMF 437 directs UPF 436 to serve UE 411 over 5GNR gNodeB 423 per the quality-of-service metrics and network addressing.

Figure 8:
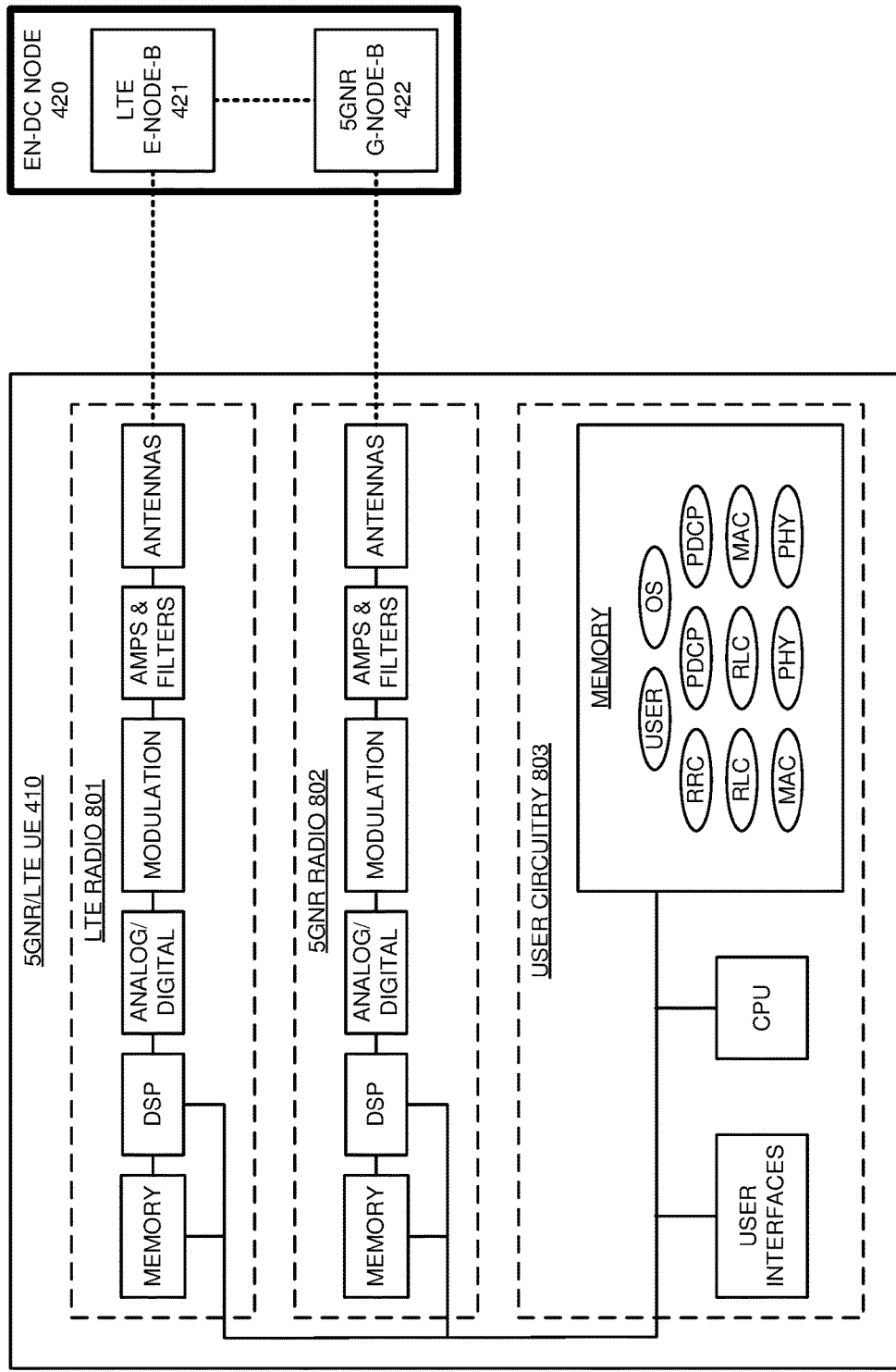
FIG. 8 illustrates the 5GNR/LTE UE that is served by the EN-DC access node over multiple wireless links based on cell site density.

FIG. 8 illustrates 5GNR/LTE UE 410 that is served by EN-DC access node 420 over multiple wireless links based on cell site density. 5GNR/LTE UE 410 is an example of UE 101, although UE 101 may differ. UE 410 comprises LTE radio 801, 5GNR radio 802, and user circuitry 803 that are coupled over bus circuitry. Radios 801-802 comprise antennas, amplifiers, filters, modulation, analog-to-digital interfaces, DSP, and memory that are coupled over bus circuitry. User circuitry 803 comprises user interfaces, CPU, and memory that are coupled over bus circuitry.

The antennas in radios 801 and 802 are wirelessly coupled to LTE eNodeB 421 and 5GNR gNodeB 422. The user interfaces in user circuitry 803 comprise graphic displays, machine controllers, sensors, cameras, transceivers, and/or some other user components. The memory in user circuitry 803 stores an operating system, user applications (USER), and network applications (PHY, MAC, RLC, PDCP, and RRC). The CPU in user circuitry 803 executes the operating system and the user applications to generate and consume user data. The CPU in user circuitry 803 executes the operating system and the network applications to wirelessly exchange corresponding signaling and data with LTE eNodeB 421 and 5GNR gNodeB 422 over radios 801 and 802.

In operation, the LTE RRC in UE 410 wirelessly attaches to LTE eNodeB 421 over antennas in LTE radio 801. The LTE RRC in UE 410 generates UL LTE signaling and UL LTE data. The UL signaling indicates 5G capabilities for UE 410 and the location of UE 410. The LTE network applications in UE 410 process the UL LTE signaling and the UL LTE data to generate corresponding UL LTE symbols that carry the UL LTE signaling and UL LTE data. The LTE DSP in LTE radio 801 processes the UL LTE symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless LTE signals that transport the UL LTE signaling (indicating the 5G UE capabilities and location) and UL LTE data for UE 410 to LTE eNodeB 421.

The LTE antennas in LTE radio 801 receive wireless DL signals having DL LTE signaling and DL LTE data and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL LTE symbols from the DL digital signals. The CPUs execute the network applications to process the DL LTE symbols and recover the DL LTE signaling and DL LTE data. The DL LTE signaling indicates a B1 measurement object, APNs, QCIs, and network addresses from LTE eNodeB 421.

In response to the B1 measurement object, the LTE RRC in UE 410 directs the 5GNR PHY to measure 5GNR signal strength of the reference signal from 5GNR gNodeB 422. The 5GNR PHY reports the 5GNR signal strength and detected PCIs to the LTE RRC. The LTE RRC in UE 410 generates a measurement report that characterizes the 5GNR signal strength and the PCIs and transfers the measurement report to LTE eNodeB 421 over LTE radio 801. LTE eNodeB 421 determines cell site density for the location of UE 410 based on the number of detected PCIs reported by UE 410. LTE eNodeB 421 determines a B1 addition threshold for 5GNR gNodeB 422 based on the cell site density. LTE eNodeB 421 determines an inter-RAT addition value based on the 5GNR signal strength. When the inter-RAT addition value is greater than the B1 addition threshold, LTE eNodeB 421 directs the 5GNR PDCP in UE 410 to attach to 5GNR gNodeB 422. 5GNR gNodeB 422 exchanges user data for UE 410 with the 5GNR PDCP in UE 410.

LTE eNodeB 421 determines a B1 drop threshold for 5GNR gNodeB 422 based on the cell site density. The LTE RRC in UE 410 directs the 5GNR PHY to measure subsequent 5GNR signal strength of reference signal from 5GNR gNodeB 422. The 5GNR PHY reports the subsequent signal strength to the LTE RRC. The LTE RRC in UE 410 wirelessly transfers the subsequent 5GNR signal strength to LTE eNodeB 421. LTE eNodeB 421 determines an inter-RAT drop value for 5GNR gNodeB 422 based on the subsequent 5GNR signal strength. When the inter-RAT drop value for 5GNR gNodeB 422 is lower than the B1 drop threshold for 5GNR gNodeB 422, LTE eNodeB 421 signals the 5GNR PDCP in UE 410 to detach from 5GNR gNodeB 422. The 5GNR PDCP in UE 410 detaches from 5GNR gNodeB 422.

Figure 9:
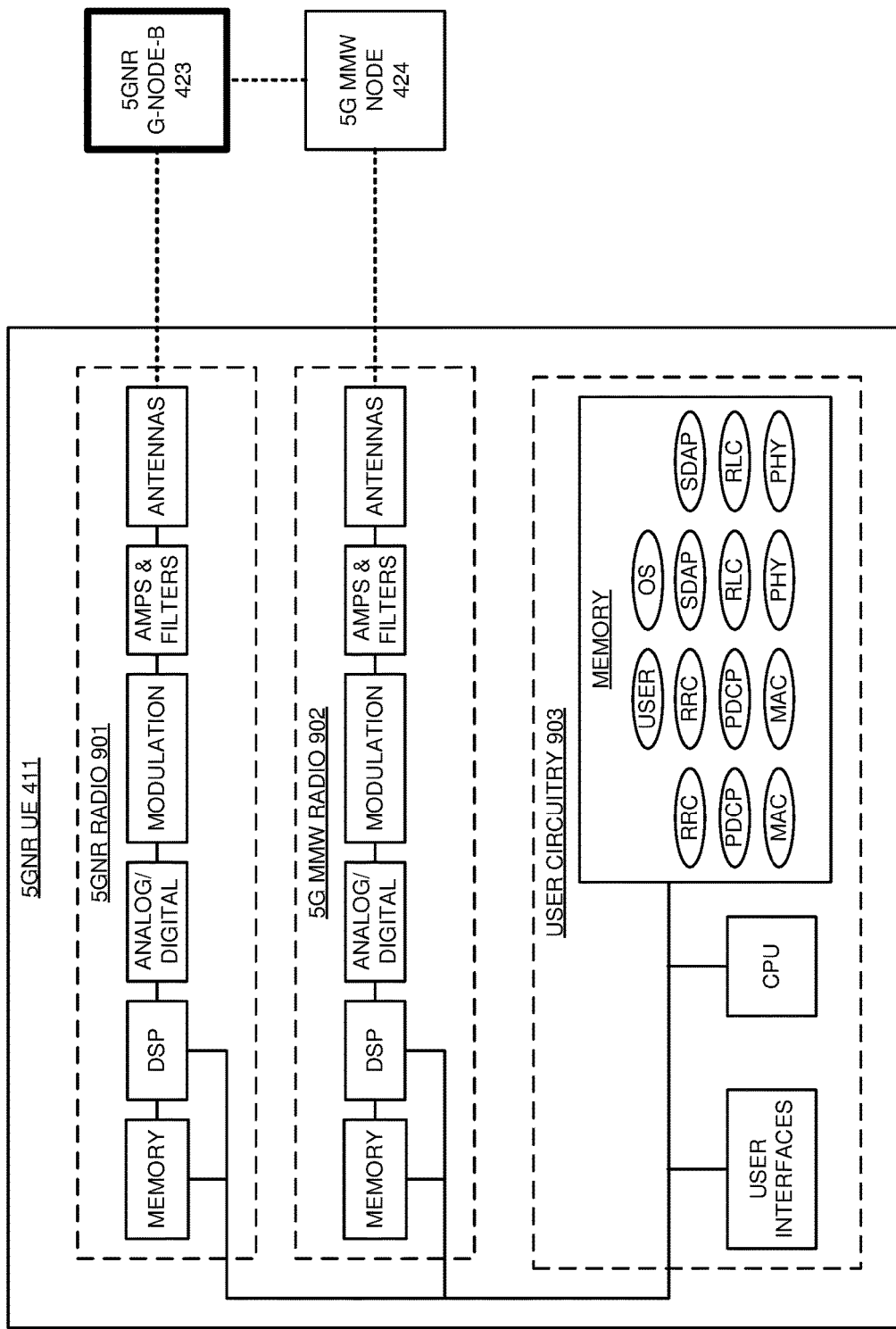
FIG. 9 illustrates the 5GNR UE that is served by the 5GNR gNodeB over multiple wireless links based on cell site density.

FIG. 9 illustrates 5GNR UE 411 that is served by 5GNR gNodeB 423 based on cell site density. 5GNR UE 411 is an example of UE 101, although UE 101 may differ. UE 411 comprises 5GNR radio 901, 5G MMW radio 902, and user circuitry 903 that are coupled over bus circuitry. Radios 901-902 comprise antennas, amplifiers, filters, modulation, analog-to-digital interfaces, DSP, and memory that are coupled over bus circuitry. User circuitry 903 comprises user interfaces, CPU, and memory that are coupled over bus circuitry. The antennas in 5GNR radio 901 are wirelessly coupled to 5GNR gNodeB 423. The antennas in 5G MMW radio 902 are wirelessly coupled to 5G MMW node 424. The user interfaces in user circuitry 903 comprise graphic displays, machine controllers, sensors, cameras, transceivers, and/or some other user components. The memory in user circuitry 903 stores an operating system, user applications, and network applications (PHY, MAC, RLC, PDCP, SDAP, and RRC). The CPU in user circuitry 903 executes the operating system and the user applications to generate and consume user data. The CPU in user circuitry 903 executes the operating system and the network applications to wirelessly exchange corresponding signaling and data with 5GNR gNodeB 423 over 5GNR radio 901 and with 5G MMW node 424 over 5G MMW radio 902.

In operation, the 5GNR RRC in UE 411 wirelessly attaches to 5GNR gNodeB 423 over antennas in 5GNR radio 901. The 5GNR RRC generates 5GNR signals that transport UL 5GNR signaling and UL 5GNR data. The 5GNR signaling indicates 5G capabilities for UE 411 and the location of UE 411. The 5GNR network applications in UE 411 process the UL 5GNR signaling and the UL 5GNR data to generate corresponding UL 5GNR symbols that carry the UL 5GNR signaling and UL 5GNR data. The 5GNR DSP in 5GNR radio 901 processes the UL 5GNR symbols to generate corresponding digital signals for the analog-to-digital interfaces. The analog-to-digital interfaces convert the digital UL signals into analog UL signals for modulation. Modulation up-converts the UL signals to their carrier frequency. The amplifiers boost the modulated UL signals for the filters which attenuate unwanted out-of-band energy. The filters transfer the filtered UL signals through duplexers to the antennas. The electrical UL signals drive the antennas to emit corresponding wireless 5GNR signals that transport the UL 5GNR signaling (indicating the 5G capabilities and location) and UL 5GNR data for UE 411 to 5GNR gNodeB 423.

The 5GNR antennas 5GNR radio 901 receive wireless DL signals that have DL 5GNR signaling, DL 5GNR data, and a 5GNR measurement object and transfer corresponding DL signals through duplexers to the amplifiers. The amplifiers boost the received DL signals for filters which attenuate unwanted energy. Demodulators down-convert the DL signals from their carrier frequency. The analog/digital interfaces convert the analog DL signals into digital DL signals for the DSP. The DSP recovers DL 5GNR symbols from the DL digital signals. The CPUs in UE 411 execute the network applications to process the DL 5GNR symbols and recover the DL 5GNR signaling having the 5GNR measurement object, QoS levels, network addresses, and the like and the DL 5GNR data.

In response to the 5GNR measurement object, the 5GNR RRC in UE 411 directs the MMW PHY in UE 411 to measure MMW signal strength of the reference signal for 5G MMW node 424. The MMW PHY reports the signal strength and detected PCIs to the 5GNR RRC. The 5GNR RRC wirelessly transfers a measurement report that characterizes the signal strength for 5G MMW node 424 and the detected PCIs to 5GNR gNodeB 423. 5GNR gNodeB 423 determines cell site density for the location of UE 411 based on the number of PCIs reported by UE 411. 5GNR gNodeB 423 determines an inter-RAT add threshold for 5G MMW node 424 based on the cell site density for the location of UE 411. 5GNR gNodeB 423 determines an inter-RAT add value for 5G MMW node 424 based on the reported signal strength. When the inter-RAT addition value is greater than the inter-RAT addition threshold for 5G MMW node 424, 5GNR gNodeB 423 directs the MMW RRC in UE 411 to attach to 5G MMW node 424. The MMW RRC in 5GNR UE 411 attaches to 5G MMW node 424 over 5G MMW radio 902. 5G MMW node 424 exchanges user data with the MMW SDAP in UE 411 and MMW signaling with the MMW RRC in UE 411.

The 5GNR RRC in UE 411 directs the 5G MMW PHY in UE 411 to measure subsequent signal strength of the reference signal for 5G MMW node 424. The MMW PHYs report the subsequent MMW signal strength to the 5GNR RRC. The 5GNR RRC wirelessly transfers a measurement report that characterizes the subsequent signal strength to 5GNR gNodeB 423. 5GNR gNodeB 423 determines an inter-RAT drop value for 5G MMW node 424 based on the cell site density and an inter-RAT drop value based on the subsequent signal strength. When the drop value is lower than the drop threshold for MMW node 424, the 5GNR RRC in 5GNR gNodeB 423 signals the MMW RRC in UE 411 to detach from 5G MMW node 424. 5G MMW node 424 to stops exchanging the user data with UE 411.

Figure 10:
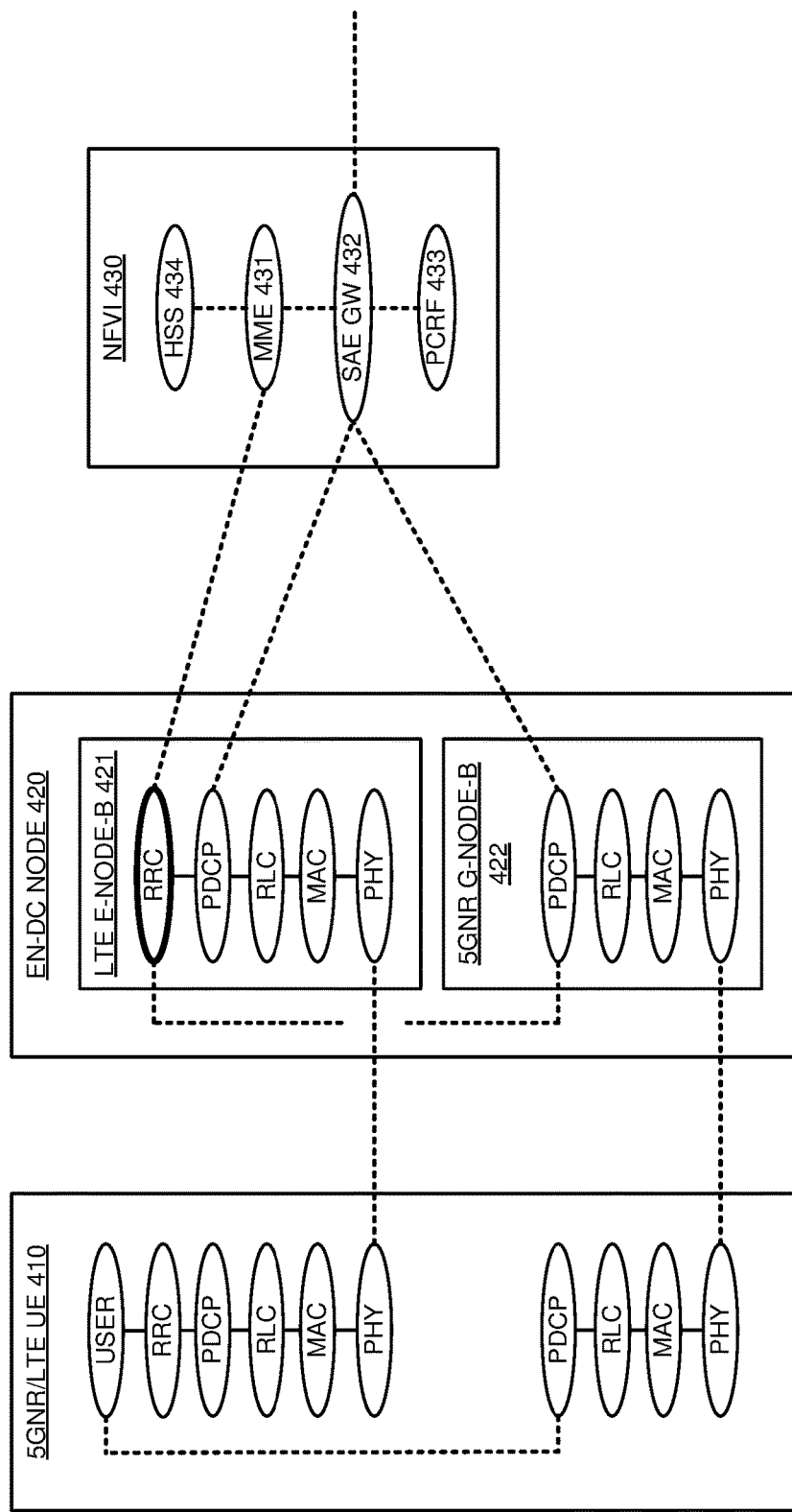
FIG. 10 illustrates an exemplary operation of the 5GNR/LTE UE, the EN-DC access node, and the NFVI to serve the 5GNR/LTE UE over multiple wireless links based on cell site density.

FIG. 10 illustrates an exemplary operation of 5GNR/LTE UE 410, EN-DC access node 420, and NFVI 430 to serve 5GNR/LTE UE 410 over multiple wireless links based on cell site density. In 5GNR/LTE UE 410, a user application requests data communication, and the LTE RRC in UE 410 attaches to the LTE RRC in LTE eNodeB 421 over the LTE PDCPs, RLCs, MACs, and PHYs. The LTE RRC in UE 410 indicates 5G capabilities for UE 410 and the location of UE 410 to the LTE RRC in LTE eNodeB 421. The LTE RRC in LTE eNodeB 421 transfers S1-MME signaling to MME 431 that requests data services and indicates the 5G capabilities for UE 410.

MME 431 interacts with HSS 434 to authenticate and authorize UE 410 for wireless data services by APNs. In response to the 5G authorization and the 5G capabilities, MME 431 generates a B1 measurement object for UE 410 that specifies frequencies for UE 410 to measure when establishing duel connectivity. MME 431 transfers the APNs for UE 410 to SAE GW 432. SAE GW 432 interacts with PCRF 433 to select QCIs and network addresses for UE 410 based on the APNs. SAE GW 432 transfers the APNs, QCIs, and addresses to MME 431. MME 431 transfers the APNs, QCIs, network address, and the B1 measurement object for UE 410 to the LTE RRC in LTE eNodeB 421. The LTE RRC in LTE eNodeB 421 transfers the APNs, QCIs, network address, and B1 measurement object to the LTE RRC in UE 410 over the PDCPs, RLCs, MACs, and PHYs. SAE GW 432 exchanges the user data with the PDCP in LTE eNodeB 421. The PDCP in LTE eNodeB 421 exchanges the user data with the LTE PDCP in UE 410 over the RLCs, MACs, and PHYs.

In response to the B1 measurement object, the LTE RRC in UE 410 directs the 5GNR PHY to measure 5GNR signal strength of the reference signal for 5GNR gNodeB 422. The 5GNR PHY reports the signal strength and detected PCIs to the LTE RRC in UE 410. The LTE RRC in UE 410 transfers a measurement report that characterizes the 5GNR signal strength and the detected PCIs to the LTE RRC in LTE eNodeB 421. The LTE RRC in LTE eNodeB 421 determines cell site density for the location of UE 410 based on the number of PCIs reported by UE 410. The LTE RRC in LTE eNodeB 421 determines a B1 addition threshold for 5GNR gNodeB 422 based on the cell site density for the location of UE 410. The LTE RRC in LTE eNodeB 421 determines frequency offset and hysteresis for 5GNR gNodeB 422. The LTE RRC in LTE eNodeB 421 determines an inter-RAT addition value for 5GNR gNodeB 422 based on the 5GNR signal strength, the frequency offset, and the hysteresis. The LTE RRC in LTE eNodeB 421 determines when the inter-RAT addition value is greater than the B1 addition threshold. When the inter-RAT addition value for 5GNR gNodeB 422 is greater than the B1 addition threshold for 5GNR gNodeB 422, the LTE RRC in LTE eNodeB 421 directs the 5GNR PDCP in 5GNR gNodeB 422 to serve UE 410. The LTE RRC in eNodeB 421 directs the 5GNR PDCP in UE 410 to attach to the 5GNR PDCP in 5GNR gNodeB 422 over the 5GNR RLCs, MACs, and PHYs. The 5GNR PDCP attaches to the 5GNR PDCP in 5GNR gNodeB 422.

The PDCP in 5GNR gNodeB 422 requests 5GNR service for UE 410 from the LTE RRC in LTE eNodeB 421 over X2 signaling. The LTE RRC in LTE eNodeB 421 requests the 5GNR service for UE 410 from MME 431 over S1-MME signaling. MME 431 directs SAE GW 432 to serve UE 410 over 5GNR gNodeB 422. MME 431 transfers the APNs, QCIs, and network address for UE 410 to the RRC in LTE eNodeB 421. The LTE RRC in LTE eNodeB 421 transfers the APNs, QCIs, and network address to the 5GNR PDCP in 5GNR gNodeB 422 over X2 signaling. The PDCP in 5GNR gNodeB 422 transfers the APNs, QCIs, and network address to the PDCP in UE 410 over the RLCs, MACs, and PHYs. SAE GW 432 exchanges user data for UE 410 with external systems. SAE GW 431 exchanges the user data with the PDCP in 5GNR gNodeB 422. The 5GNR PDCP in 5GNR gNodeB 422 exchanges the user data with the 5GNR PDCP in UE 410 over the RLCs, MACs, and PHYs.

Figure 11:
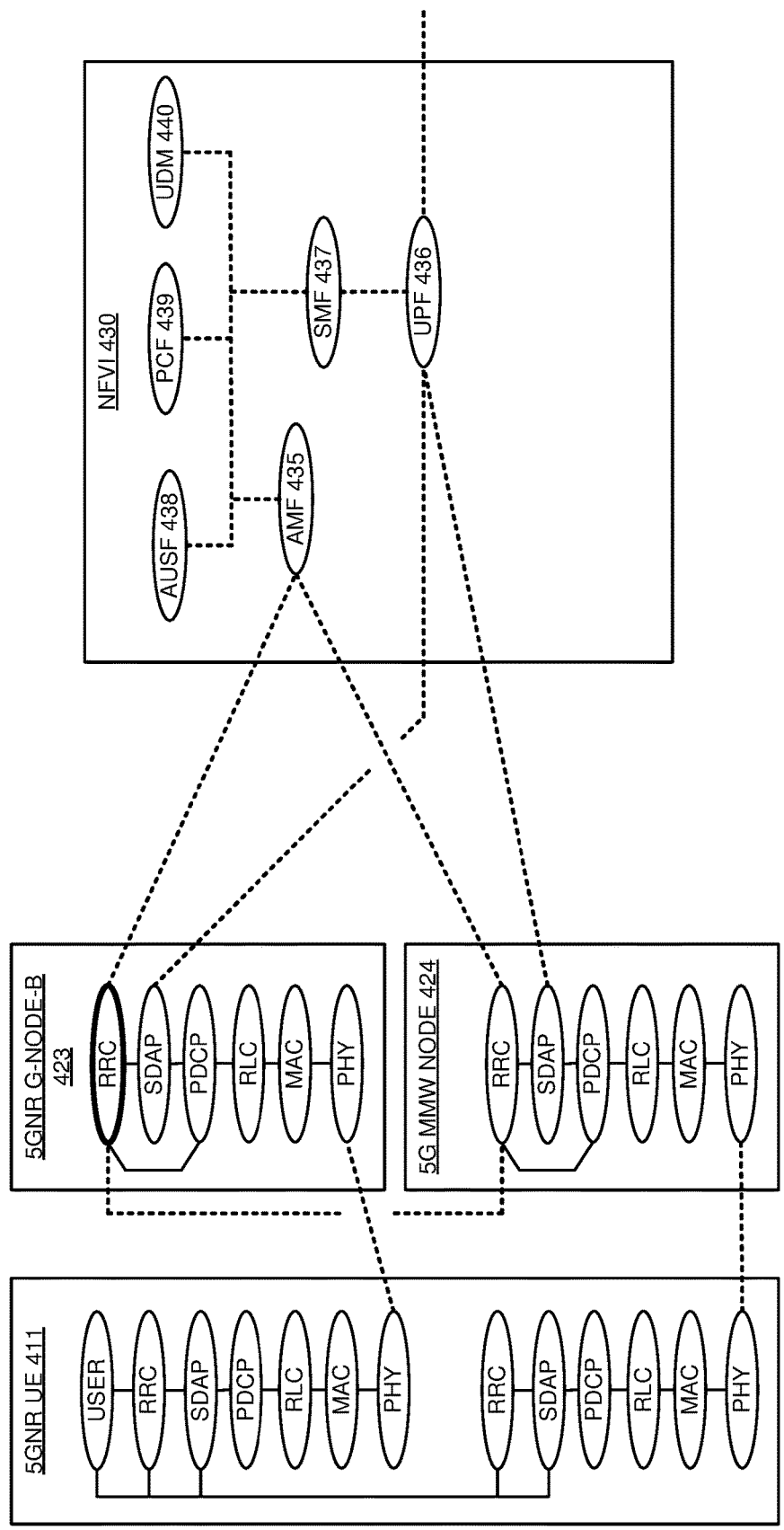
FIG. 11 illustrates an exemplary operation of the 5GNR UE, the 5GNR gNodeB, a 5G MMW access node, and the NFVI to serve the 5GNR UE over multiple wireless links based on cell site density.

The RRC in LTE eNodeB 421 determines a B1 drop threshold for 5GNR gNodeB 422 based on the cell site density. The LTE RRC in UE 410 directs the 5GNR PHY to measure subsequent 5GNR signal strength. The PHY reports the signal strength to the LTE RRC in UE 410. The LTE RRC in UE 410 transfers the subsequent signal strength to the LTE RRC in LTE eNodeB 421 over the PDCPs, RLCs, MACs, and PHYs. The LTE RRC in LTE eNodeB 421 determines an inter-RAT drop value for 5GNR gNodeB 422 based on the subsequent 5GNR signal strength. The LTE RRC in LTE eNodeB 421 determines when the inter-RAT drop value is less than the B1 drop threshold. When the inter-RAT drop value is less than the B1 drop threshold, the LTE RRC in LTE eNodeB 421 directs the 5GNR PDCP in 5GNR gNodeB 422 to stop serving UE 410 and notifies MME 431. The LTE RRC in LTE eNodeB 421 directs the 5GNR PDCP in UE 410 to detach. UE 410 detaches from 5GNR gNodeB 422. MME 431 directs SAE GW 432 to stop serving UE 410 over 5GNR gNodeB 422. SAE GW 432 stops exchanging 5GNR data with the 5GNR PDCP in 5GNR gNodeB 422. The PDCP in 5GNR gNodeB 422 stops exchanging the data with the PDCP in UE 410 over the RLCs, MACs, and PHYs FIG. 11 illustrates an exemplary operation of UE 411, 5GNR gNodeB 423, 5G MMW node 424, and NFVI 430 to serve UE 411 over multiple wireless links based on cell site density. In 5GNR UE 411, a user application requests data communication, and the 5GNR RRCs in UE 411 attach to the 5GNR RRC in 5GNR gNodeB 423 over the 5GNR PDCPs, RLCs, MACs, and PHYs. The 5GNR RRC in UE 411 indicates 5G UE capabilities and the location of UE 411 to the 5GNR RRC in 5GNR gNodeB 423. The 5GNR RRC in 5GNR gNodeB 423 sends a request for data services for 5GNR UE 411 in N2 signaling to AMF 435 over the backhaul links. AMF 435 interacts with SMF 437, AUSF 438, PCF 439, UDM 440, and typically other functions to authenticate and authorize 5GNR UE 411 for 5G data services. SMF 437 directs UPF 436 to serve UE 411 per the quality-of-service metrics and network addressing. AMF 435 generates a 5GNR measurement object for UE 411 responsive to the 5G authorization and 5G UE capabilities that specifies frequencies for UE 411 to measure when establishing duel connectivity. AMF 435 transfers quality-of-service metrics, network addressing, and the 5GNR measurement object for UE 411 to the 5GNR RRC in 5GNR gNodeB 423 in N2 signaling. The 5GNR RRC in 5GNR gNodeB 423 transfers the selected APNs, QCIs, network addresses, and 5GNR measurement object to the 5GNR RRC in UE 411 over the PDCPs, RLCs, MACs, and PHYs.

In response to the 5GNR measurement object, the 5GNR RRC in UE 411 directs the MMW PHY to measure the signal strength for 5G MMW node 424. The MMW PHY reports the signal strength and detected PCIs to the 5GNR RRC in UE 411. The 5GNR RRC generates a measurement report characterizing the signal strength and the PCIs and wirelessly transfers the measurement report to the 5GNR RRC in 5GNR gNodeB 423 over the PDCPs, RLCs, MACs, and PHYs. The 5GNR RRC in 5GNR gNodeB 423 determines a cell site density for the location of UE 411 based on the number of PCIs reported by UE 411. The 5GNR RRC in 5GNR gNodeB 423 determines an inter-RAT addition threshold for 5G MMW node 424 based on the cell site density of the location of UE 411.

The 5GNR RRC in 5GNR gNodeB 423 determines the frequency offset, and the hysteresis for 5G MMW node 424. The 5GNR RRC in 5GNR gNodeB 423 determines an inter-RAT addition value for 5G MMW node 424 based on the MMW signal strength, the frequency offset, and the hysteresis. The 5GNR RRC in 5GNR gNodeB 423 determines when the inter-RAT addition value is greater than the inter-RAT addition threshold. When the inter-RAT addition value is greater than the inter-RAT addition threshold for 5G MMW node 424, the 5GNR RRC in 5GNR gNodeB 423 directs the MMW RRC in 5G MMW node 424 to serve UE 411. The 5GNR RRC in 5GNR gNodeB 423 directs UE 411 to attach to 5G MMW node 424. The MMW RRC in UE 411 attaches to the RRC in 5G MMW node 424 over the PDCPs, RLCs, MACs, and PHYs. The MMW RRC in 5G MMW node 424 requests MMW service for UE 411 from AMF 435. UPF 436 exchanges user data for UE 411 with external systems. UPF 436 exchanges the user data with the SDAPs in 5G MMW node 424. The SDAPs in 5G MMW node 424 exchange the user data with the SDAPs in 5GNR UE 411 over the PDCPs, RLCs, MACs, and PHYs. The SDAPs in UE 411 exchange the user data with the user applications.

The 5GNR RRC in 5GNR gNodeB 423 determines an inter-RAT drop threshold for 5G MMW node 424 based on the cell site density. The 5GNR RRC in UE 411 directs the MMW PHY in UE 411 to measure subsequent signal strength for 5G MMW node 424. The MMW PHY reports the subsequent signal strength to the 5GNR RRC. The 5GNR RRC in UE 411 transfers the subsequent signal strength to the 5GNR RRC in 5GNR gNodeB 423. The 5GNR RRC in 5GNR gNodeB 423 determines an inter-RAT drop value for 5G MMW node 424 based on the subsequent signal strength. The 5GNR RRC in 5GNR gNodeB 423 determines when the inter-RAT drop value is less than the inter-RAT drop threshold. When the inter-RAT drop value for MMW node 424 is less than the inter-RAT drop threshold, the 5GNR RRC in 5GNR gNodeB 423 directs the MMW RRC in 5G MMW node 424 to stop serving UE 411 and directs the MMW RRC in UE 411 to detach from the MMW RRC in 5G MMW node 424. The RRC in 5G MMW node 424 stops exchanging the user data with the RRC in UE 411 over their PDCPs, RLCs, MACs, and PHYs.

The wireless data network circuitry described above comprises computer hardware and software that form special-purpose network circuitry to serve wireless UEs over multiple wireless links based on cell site density. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs based on cell site density.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method for operating a primary access node to add a secondary access node to deliver wireless communication service to a User Equipment (UE) in a geographic region, the method comprising:
   a radio wirelessly receiving a measurement report from the UE characterizing a radio metric for the secondary access node and transferring the measurement report to a baseband circuitry;
   the baseband circuitry determining an amount of Physical Cell Identifiers (PCIs) for the geographic region, determining a cell site density for the geographic region based on the amount of PCIs for the geographic region, determining an add threshold for the secondary access node based on the cell site density, receiving and processing the measurement report and responsively determining an add value for the secondary access node based on the radio metric in the measurement report, and determining when the add value exceeds the add threshold;
   when the add value exceeds the add threshold, the baseband circuitry transferring network signaling to the secondary access node to serve the UE and transferring user signaling to the radio, and when the add value does not exceed the add threshold, the baseband circuitry does not transfer network signaling to the secondary access node to serve the UE and does not transfer user signaling to the radio that directs the UE to attach to the secondary access node; and
   the radio wirelessly transferring the user signaling to the UE to attach to the secondary access node, wherein the UE attaches to the secondary access node responsive to the user signaling and the secondary access node delivers the wireless communication service to the UE responsive to the network signaling.

2. The method of claim 1, wherein the baseband circuitry determining the amount of PCIs for the geographic region comprises the baseband circuitry determining the amount of PCIs based on the measurement report.

3. The method of claim 1 further comprising:
   the baseband circuitry determining when the secondary access node comprises a best available secondary access node; and
   the baseband circuitry transferring user signaling to the radio that directs the UE to attach to the secondary access node when the add value exceeds the add threshold and when the secondary access node comprises the best available secondary access node.

4. The method of claim 1 further comprising the baseband circuitry determining an X2-links Round Trip Time (RTT) for the secondary node; and wherein:
   the baseband circuitry determining the add threshold for the secondary access node comprises the baseband circuitry determining the add threshold for the secondary access node based on the X2-links RTT for the secondary access node and the cell site density.

5. The method of claim 4 wherein the baseband circuitry determining the RTT comprises the baseband circuitry executing a Radio Resource Control (RRC) and the RRC determining an X2-Control (X2-C) links RTT for the secondary access node.

6. The method of claim 4 wherein the baseband circuitry determining the RTT comprises the baseband circuitry executing a Packet Data Convergence Protocol (PDCP) and the PDCP determining an X2-User (X2-U) links RTT for the secondary access node.

7. The method of claim 1 further comprising the baseband circuitry determining whether the secondary access node comprises a Non-Stand Alone (NSA) access node or a Stand Alone (SA) access node; and wherein:
   the baseband circuitry determining the add threshold for the secondary access node comprises the baseband circuitry determining the add threshold for the secondary access node based on whether the secondary access node comprises an NSA access node or an SA access node and the cell site density.

8. The method of claim 1 wherein the primary access node comprises a Fifth Generation New Radio (SGNR) gNodeB and the secondary access node comprises a 5G MMW access node.

9. The method of claim 1 wherein the primary access node comprises an LTE eNodeB and the secondary access node comprises a SGNR gNodeB.

10. A primary access node configured to add a secondary access node to deliver wireless communication service to a UE located in a geographic region, the primary access node comprising:
    a radio configured to wirelessly receive a measurement report from the UE characterizing a radio metric for the secondary access node and transfer the measurement report to a baseband circuitry;
    the baseband circuitry configured to determine an amount of Physical Cell Identifiers (PCIs) for the geographic region, determine a cell site density for the geographic region based on the amount of PCIs for the geographic region, determine an add threshold for the secondary access node based on the cell site density, receive and process the measurement report and responsively determine an add value for the secondary access node based on the radio metric in the measurement report, and determine when the add value exceeds the add threshold;

when the add value exceeds the add threshold, the baseband circuitry configured to transfer network signaling to the secondary access node to serve the UE and transfer user signaling to the radio; and the radio configured to wirelessly transfer the user signaling to the UE to attach to the secondary access node, wherein the UE attaches to the secondary access node responsive to the user signaling and the secondary access node delivers the wireless communication service to the UE responsive to the network signaling.

11. The primary access node of claim 10 wherein the baseband circuitry configured to determine the amount of PCIs for the geographic region comprises the baseband circuitry configured to determine the amount of PCIs based on the measurement report.

12. The primary access node of claim 10 further comprising:

the baseband circuitry configured to determine when the secondary access node comprises a best available secondary access node; and the baseband circuitry configured to transfer user signaling to the radio that directs the UE to attach to the secondary access node when the add value exceeds the add threshold and when the secondary access node comprises the best available secondary access node.

13. The primary access node of claim 10 further comprising the baseband circuitry configured to determine an X2-links Round Trip Time (RTT) for the secondary node; and wherein:

the baseband circuitry is configured to determine the add threshold for the secondary access node comprises the baseband circuitry configured to determine the add threshold for the secondary access node based on the X2-links RTT for the secondary access node and the cell site density.

14. The primary access node of claim 13 wherein the baseband circuitry configured to determine the X-2 RTT comprises the baseband circuitry configured to execute a Radio Resource Control (RRC) and the RRC configured to determine an X2-Control (X2-C) links RTT for the secondary access node.

15. The primary access node of claim 13 wherein the baseband circuitry configured to determine the RTT comprises the baseband circuitry configured to execute a Packet Data Convergence Protocol (PDCP) and the PDCP configured to determine an X2-User (X2-U) links RTT for the secondary access node.

16. The primary access node of claim 10 further comprising the baseband circuitry configured to determine whether the secondary access node comprises a Non-Stand Alone (NSA) access node or a Stand Alone (SA) access node; and wherein:

the baseband circuitry is configured to determine the add threshold for the secondary access node comprises the baseband circuitry configured to determine the add threshold for the secondary access node based on whether the secondary access node comprises an NSA access node or an SA access node and the cell site density.

17. The primary access node of claim 10 wherein the primary access node comprises a Fifth Generation New Radio (SGNR) gNodeB and the secondary access node comprises a 5G MMW access node.

18. The primary access node of claim 10 wherein the primary access node comprises an LTE eNodeB and the secondary access node comprises a SGNR gNodeB.

* * * * *